US009829605B2

(12) United States Patent
Takeda et al.

(10) Patent No.: US 9,829,605 B2
(45) Date of Patent: Nov. 28, 2017

(54) POLARIZED FILM, OPTICAL FILM, AND IMAGE DISPLAY DEVICE

(71) Applicant: NITTO DENKO CORPORATION, Ibaraki-shi, Osaka (JP)

(72) Inventors: Tetsurou Takeda, Ibaraki (JP); Mie Nakata, Ibaraki (JP); Shunsuke Murayama, Ibaraki (JP); Tomohiro Yamashita, Ibaraki (JP); Takeshi Saito, Ibaraki (JP); Kunihiro Inui, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 457 days.

(21) Appl. No.: 14/388,926

(22) PCT Filed: Mar. 29, 2013

(86) PCT No.: PCT/JP2013/059602
§ 371 (c)(1),
(2) Date: Sep. 29, 2014

(87) PCT Pub. No.: WO2013/147192
PCT Pub. Date: Oct. 3, 2013

(65) Prior Publication Data
US 2015/0049380 A1 Feb. 19, 2015

(30) Foreign Application Priority Data

Mar. 30, 2012 (JP) ................................ 2012-081211
Mar. 28, 2013 (JP) ................................ 2013-069179

(51) Int. Cl.
| B32B 37/18 | (2006.01) |
| B32B 37/12 | (2006.01) |
| C09J 4/00 | (2006.01) |
| G02B 5/30 | (2006.01) |
| G02B 1/14 | (2015.01) |
| G02B 1/18 | (2015.01) |
| B32B 38/00 | (2006.01) |
| G02B 1/10 | (2015.01) |
| G02B 5/20 | (2006.01) |
| C08F 220/28 | (2006.01) |

(52) U.S. Cl.
CPC ............... *G02B 1/14* (2015.01); *B32B 37/12* (2013.01); *B32B 37/18* (2013.01); *B32B 38/0008* (2013.01); *B32B 38/0036* (2013.01); *C09J 4/00* (2013.01); *G02B 1/105* (2013.01); *G02B 1/18* (2015.01); *G02B 5/208* (2013.01); *G02B 5/30* (2013.01); *G02B 5/3033* (2013.01); *B32B 2037/1253* (2013.01); *B32B 2307/42* (2013.01); *B32B 2551/00* (2013.01); *C08F 2220/283* (2013.01); *Y10T 428/24942* (2015.01); *Y10T 428/24959* (2015.01)

(58) Field of Classification Search
None
See application file for complete search history.

(56) References Cited

U.S. PATENT DOCUMENTS

| 2006/0076541 | A1 | 4/2006 | Yoshida et al. | |
| 2008/0252973 | A1* | 10/2008 | Akari | G02B 5/3033 359/485.01 |
| 2009/0040611 | A1 | 2/2009 | Kitamura et al. | |
| 2012/0328873 | A1 | 12/2012 | Kishioka et al. | |
| 2012/0329970 | A1 | 12/2012 | Kishioka et al. | |
| 2013/0293949 | A1* | 11/2013 | Saito | C09J 4/00 359/352 |

FOREIGN PATENT DOCUMENTS

| CN | 101363932 A | 2/2009 |
| JP | 2001-296427 A | 10/2001 |
| JP | 2006-220732 A | 8/2006 |
| JP | 2008-9329 A | 1/2008 |
| JP | 2008-065251 A | 3/2008 |
| JP | 2008-076764 A | 4/2008 |
| JP | 2008-241946 A | 10/2008 |
| JP | 2008-250260 A | 10/2008 |
| JP | 2008-273148 A | 11/2008 |
| JP | 2009-157352 A | 7/2009 |
| JP | 2009-276451 A | 11/2009 |
| JP | 2009-294649 A | 12/2009 |
| JP | 2010-054720 A | 3/2010 |
| JP | 2010-078700 A | 4/2010 |

(Continued)

OTHER PUBLICATIONS

Office Action dated Aug. 1, 2016, issued in counterpart Taiwanese Patent Application No. 102111626, with English translation. (14 pages).
Office Action dated Feb. 2, 2016, issued in counterpart Chinese Patent Application No. 201380015662.X, with English translation (23 pages).
Notification of Transmittal of Translation of the International Preliminary Report on Patentability (Chapter I or Chapter II) (Form PCT/IB/338) of International Application No. PCT/JP2013/059602 dated Oct. 9, 2014 with Forms PCT/IB373 and PCT/ISA/237. (10 pages).
International Search Report dated May 21, 2013, issued in corresponding application No. PCT/JP2013/059602.
Office Action dated Dec. 6, 2016, issued in counterpart Japanese Patent Application No. 2013-069179, with English machine translation (19 pages).
Office Action dated Aug. 24, 2017, issued in counterpart Japanese Patent Application No. 2013-069179, with English machine translation (6 pages).

*Primary Examiner* — Sheeba Ahmed
(74) *Attorney, Agent, or Firm* — Westerman, Hattori, Daniels & Adrian, LLP

(57) ABSTRACT

A polarizing film, comprising a polarizer; transparent protective films with a water-vapor permeability of 150 g/m2/24 hours or less provided on both sides of the polarizer; and adhesive layers each interposed between the polarizer and one of the transparent protective films, wherein the adhesive layers are formed by applying an active energy ray to an active energy ray-curable adhesive composition containing a radically polymerizable compound, and the transparent protective films are bonded to the polarizer with the adhesive layers.

28 Claims, No Drawings

(56) References Cited

FOREIGN PATENT DOCUMENTS

| | | |
|---|---|---|
| JP | 2010-117721 A | 5/2010 |
| JP | 2010-238322 A | 10/2010 |
| JP | 2011-132403 A | 7/2011 |
| JP | 2011-236298 A | 11/2011 |
| JP | 2012-52000 A | 3/2012 |
| WO | 2006/041032 A1 | 4/2006 |
| WO | 2011/111576 A1 | 9/2011 |
| WO | 2012/086465 A1 | 6/2012 |
| WO | WO2012/086465 * | 6/2012 |

* cited by examiner

POLARIZED FILM, OPTICAL FILM, AND IMAGE DISPLAY DEVICE

TECHNICAL FIELD

The present invention relates to a polarizing film (polarizing plate) including a polarizer and transparent protective films provided on both sides of the polarizer with an adhesive interposed therebetween and made from an active energy ray-curable adhesive composition. The polarizing film may be used alone or as a part of a laminated optical film to form an image display device such as a liquid crystal display (LCD), an organic electroluminescent (EL) display, a cathode ray tube (CRT), or a plasma display panel (PDP).

BACKGROUND ART

The liquid crystal display market has experienced rapid growth in many applications such as clocks, cellular phones, personal digital assistants (PDAs), notebook PCs, PC monitors, DVD players, and TVs. Liquid crystal display devices use liquid crystal switching to visualize the polarization state, and based on the display principle, they use polarizers. Particularly in TV applications and so on, higher brightness, higher contrast, and wider viewing angle are required, and polarizing films are also required to have higher transmittance, higher degree of polarization, and higher color reproducibility.

For example, iodine polarizers made of stretched polyvinyl alcohol (hereinafter, also simply referred to as "PVA") to which iodine is adsorbed have high transmittance and high degree of polarization. Therefore, they are most popular polarizers widely used. A polarizing film commonly used includes a polarizer and transparent protective films bonded to both sides of the polarizer with a solution of a polyvinyl alcohol-based material in water, what is called an aqueous adhesive (Patent Documents 1 and 2 listed below).

A polarizing film can be produced using an aqueous adhesive such as a polyvinyl alcohol-based adhesive. In this case (what is called wet lamination), a drying step is necessary after a polarizer and a transparent protective film are bonded together. Such a method of manufacturing a polarizing film using an aqueous adhesive includes a drying step. Therefore, a transparent protective film with high water-vapor permeability, such as a triacetylcellulose film, is used in such a method. In addition, when an aqueous adhesive is used, the polarizer also needs to have relatively high water content so that the adhesive can have high tackiness to the polarizer. Otherwise, good tackiness cannot be achieved in the resulting polarizing film. Unfortunately, the polarizing film obtained in such a way has problems such as undesired optical properties (polarization properties) or degradation of durability against heating or humidification.

On the other hand, polarizing films can be easily influenced by humidity. When absorbing moisture from the air, transparent protective films can suffer from defects such as wavy curing or dimensional changes. In order to prevent a polarizing film from undergoing curling or dimensional changes in its storage environment, the water content of the polarizer may be reduced, or a transparent protective film with low water-vapor permeability may be used. However, if a polarizer and a transparent protective film with low water-vapor permeability are bonded together with an aqueous adhesive, drying efficiency will decrease because of the low water-vapor permeability of the transparent protective film, which makes it difficult to sufficiently remove water, as the solvent of the aqueous adhesive, by drying. As a result, the resulting polarizing film can have degraded polarization properties or insufficient durability, so that appearance defects can occur, which makes it impossible to obtain practically useful polarizing films.

PRIOR ART DOCUMENTS

Patent Documents

Patent Document 1: JP-A-2006-220732
Patent Document 2: JP-A-2001-296427

SUMMARY OF THE INVENTION

Problems to be Solved by the Invention

It is an object of the present invention to provide a polarizing film that includes a polarizer and transparent protective films provided on both sides of the polarizer with an adhesive layer interposed between the polarizer and each protective film and has a sufficient level of optical properties and durability and is less variable in water content even when the transparent protective films have low water-vapor permeability.

It is another object of the present invention to provide an optical film produced with such a polarizing film and to provide an image display device such as a liquid crystal display device produced with such a polarizing film or such an optical film.

Means for Solving the Problems

As a result of earnest studies to solve the problems, the present inventors have accomplished the present invention based on findings that the objects can be achieved by providing the polarizing film described below.

Specifically, the present invention is directed to a polarizing film, including: a polarizer; transparent protective films with a water-vapor permeability of 150 g/m$^2$/24 hours or less provided on both sides of the polarizer; and adhesive layers each interposed between the polarizer and one of the transparent protective films, wherein the adhesive layers are formed by applying active energy rays to an active energy ray-curable adhesive composition containing a radically polymerizable compound, and the transparent protective films are bonded to the polarizer with the adhesive layers.

In the polarizing film, the adhesive layers preferably have a glass transition temperature Tg of 60° C. or more.

In the polarizing film, the active energy ray-curable adhesive composition preferably contains 20 to 60% by weight of (A) a radically polymerizable compound with an SP value of 29.0 $(MJ/m^3)^{1/2}$ to 32.0 $(MJ/m^3)^{1/2}$, 10 to 30% by weight of (B) a radically polymerizable compound with an SP value of 18.0 $(MJ/m^3)^{1/2}$ to less than 21.0 $(MJ/m^3)^{1/2}$, and 20 to 60% by weight of (C) a radically polymerizable compound with an SP value of 21.0 $(MJ/m^3)^{1/2}$ to 23.0 $(MJ/m^3)^{1/2}$, based on 100% by weight of the total amount of the composition, and the radically polymerizable compounds (A), (B), and (C) are each preferably capable of forming a homopolymer with a glass transition temperature (Tg) of 60° C. or more.

In the polarizing film, the active energy ray-curable adhesive composition preferably further contains (D) a radically polymerizable compound having an active methylene group and (E) a radical polymerization initiator having a hydrogen-withdrawing function.

In the polarizing film, the active methylene group is preferably an acetoacetyl group.

In the polarizing film, the radically polymerizable compound (D) is preferably acetoacetoxyalkyl (meth)acrylate.

In the polarizing film, the radical polymerization initiator (E) is preferably a thioxanthone radical polymerization initiator.

In the polarizing film, the composition preferably contains 1 to 50% by weight of the radically polymerizable compound (D) and 0.1 to 10% by weight of the radical polymerization initiator (E) based on 100% by weight of the total amount of the composition.

In the polarizing film, the active energy ray-curable adhesive composition preferably further contains (F) a photo-acid generator.

In the polarizing film, the photo-acid generator (F) preferably includes a photo-acid generator having at least one counter anion selected from the group consisting of $PF_6^-$, $SbF_6^-$, and $AsF_6^-$.

In the polarizing film, the active energy ray-curable adhesive composition preferably contains the photo-acid generator (F) and (G) a compound having either an alkoxy group or an epoxy group.

In the polarizing film, the active energy ray-curable adhesive composition preferably contains (H) an amino group-containing silane coupling agent.

In the polarizing film, the active energy ray-curable adhesive composition preferably contains 0.01 to 20% by weight of the amino group-containing silane coupling agent (H) based on 100% by weight of the total amount of the composition.

In the polarizing film, the radically polymerizable compound (A) is preferably hydroxyethylacrylamide and/or N-methylolacrylamide.

In the polarizing film, the radically polymerizable compound (B) is preferably tripropylene glycol diacrylate.

In the polarizing film, the radically polymerizable compound (C) is preferably acryloylmorpholine and/or N-methoxymethylacrylamide.

In the polarizing film, the active energy ray-curable adhesive composition preferably contains, as a photopolymerization initiator, a compound represented by general formula (1):

[Formula 1]

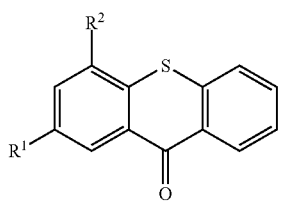

(1)

wherein $R^1$ and $R^2$ each represent —H, —$CH_2CH_3$, -i-Pr, or Cl, and $R^1$ and $R^2$ may be the same or different.

In the polarizing film, the active energy ray-curable adhesive composition preferably further contains, as a photopolymerization initiator, a compound represented by general formula (2):

[Formula 2]

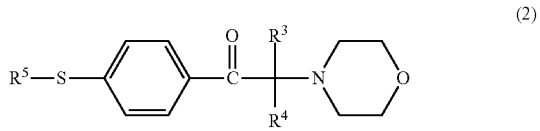

(2)

wherein $R^3$, $R^4$, and $R^5$ each represent —H, —$CH_3$, —$CH_2CH_3$, -i-Pr, or Cl, and $R^3$, $R^4$, and $R^5$ may be the same or different.

In the polarizing film, the transparent protective films preferably have a 365 nm wavelength light transmittance of less than 5%.

In the polarizing film, the transparent protective films preferably have an SP value of 29.0 $(MJ/m^3)^{1/2}$ to less than 33.0 $(MJ/m^3)^{1/2}$.

In the polarizing film, the transparent protective films preferably have an SP value of 18.0 $(MJ/m^3)^{1/2}$ to less than 24.0 $(MJ/m^3)^{1/2}$.

In the polarizing film, the transparent protective films are preferably made of one material selected from polycarbonate resin, cyclic olefin polymer resin, and (meth)acrylic resin.

In the polarizing film, the adhesive layers preferably have a thickness of 0.01 to 7 μm.

The present invention is also directed to a method of manufacturing a polarizing film including a polarizer and a transparent protective film that is provided on at least one surface of the polarizer with an adhesive layer interposed therebetween and has a water-vapor permeability of 150 $g/m^2/24$ hours or less and a 365 nm wavelength light transmittance of less than 5%, the method including: an application step including applying an active energy ray-curable adhesive composition to at least one surface of the polarizer or the transparent protective film, wherein the active energy ray-curable adhesive composition contains a radically polymerizable compound; a lamination step including laminating the polarizer and the transparent protective film; and a bonding step including curing the active energy ray-curable adhesive composition by applying active energy rays to the composition from the polarizer side or the transparent protective film side to form an adhesive layer, so that the polarizer and the transparent protective film are bonded with the adhesive layer interposed therebetween.

In the polarizing film manufacturing method, before the application step, at least one surface of the polarizer or the transparent protective film, to which the active energy ray-curable adhesive composition is to be applied, is preferably subjected to a corona treatment, a plasma treatment, a flame treatment, or an excimer treatment.

In the polarizing film manufacturing method, during the bonding step, the polarizer preferably has a water content of less than 15%.

The present invention is further directed to an image display device including the polarizing film and/or the optical film. In the optical film and the image display device, the polarizer and the transparent protective films of the polarizing film are firmly bonded with the adhesive layer that is interposed between the polarizer and each transparent protective film and has a high level of durability and water resistance.

Effect of the Invention

In the polarizing film of the present invention, the transparent protective films with a low water-vapor permeability are provided on both sides of the polarizer. Thus, the moisture in the air is less likely to enter the polarizing film, so that the polarizing film itself can be prevented from undergoing changes in water content. In this way, the polarizing film of the present invention resists changes in water resistance and also resists storage environment-induced curling or dimensional change.

On the other hand, if a transparent protective film with low water-vapor permeability is used together with an aqueous adhesive, it will be difficult to sufficiently remove water, as the solvent of the aqueous adhesive, by drying. Specifically, it is conceivable that in the process of bonding a polarizer and a protective film with an aqueous adhesive, water in the aqueous adhesive can be left in the resulting polarizing film without evaporating, so that the water can decompose a PVA-iodine complex in the polarizer. In addition, if water is not easily removed from the polarizing film in a drying process, excess heat can be applied for the drying, so that the polarizer can be in an extremely steam-heated state. In addition, if the drying process is insufficient, it will be difficult to impart a satisfactory level of durability and other desired properties to the resulting polarizing film.

In the polarizing film of the present invention, the transparent protective films with a low water-vapor permeability are bonded to both sides of the polarizer with the adhesive layers that are formed not using any aqueous adhesive but using an active energy ray-curable adhesive composition containing a radically polymerizable compound. The active energy ray-curable adhesive composition can be water-free. Therefore, even when transparent protective films with low water-vapor permeability are provided on both sides of a polarizer, a highly durable polarizing film with excellent optical properties (polarization properties) can be provided, in which the decomposition of a PVA-iodine complex is prevented in the polarizer.

In cationic polymerization curing, water can function as an adhesion inhibitor, and the presence of water can cause adhesive failure. Thus, if an active energy ray-curable adhesive composition containing a cationically polymerizable compound is used, the polarizer to be used must have a considerably low water content (10% by weight or less). In order to reduce the water content of the polarizer, however, it is necessary to dry the polarizer, which results in a reduction in productivity. In addition, a polarizer with too low a water content can be easily damaged and suffer from an increased number of point defects such as air bubbles in the process of bonding a transparent protective film to it. This means that for the purpose of producing a polarizing film with less point defects and a good appearance, an active energy ray-curable adhesive composition containing a radically polymerizable compound is superior to that containing a cationically polymerizable compound.

The active energy ray-curable adhesive composition for the polarizing film of the present invention preferably includes a composition containing a combination of radically polymerizable compounds with specific SP values (solubility parameters). Materials having SP values close to each other are generally considered to have high affinity for each other. Polarizers have relatively high SP values (for example, a PVA-based polarizer has an SP value of 32.8). On the other hand, transparent protective films generally have relatively low SP values (SP values of about 18 to about 24). For example, therefore, radically polymerizable compounds having SP values close to each other can have high compatibility with each other, and as the SP values of the polarizer and the radically polymerizable compound in the active energy ray-curable adhesive composition become close to each other, the tackiness between the adhesive layer and the polarizer increases. Similarly, as the SP value of the radically polymerizable compound in the active energy ray-curable adhesive composition becomes close to the SP value of the transparent protective film with low water-vapor permeability (an acrylic resin film or a cycloolefin resin film), the tackiness between the adhesive layer and the transparent protective film with low water-vapor permeability increases. Based on these tendencies, the active energy ray-curable adhesive composition to be used can be designed to contain at least three radically polymerizable compounds each having an SP value in a specific range and being mixed in an optimal ratio.

The adhesive layer may be made of a curing product of the active energy ray-curable adhesive composition designed to have SP values in specific ranges and to have an optimal composition ratio as mentioned above. In this case, the tackiness between the polarizer and the transparent protective film with low water-vapor permeability can be improved, and the resulting adhesive layer can have a higher level of durability and water resistance.

MODE FOR CARRYING OUT THE INVENTION

The polarizing film of the present invention includes a polarizer, transparent protective films with a low water-vapor permeability provided on both sides of the polarizer, and adhesive layers each interposed between the polarizer and one of the transparent protective films, wherein the adhesive layers are formed by applying active energy rays to an active energy ray-curable adhesive composition containing a radically polymerizable compound, and the transparent protective films are bonded to the polarizer with the adhesive layers.

<Polarizer>

Any of various polarizers may be used without restriction. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film or may be a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally, but not limited to, about 80 μm or less. In general, the thickness of the polarizer is preferably from 15 to 35 μm.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of boric acid or potassium iodide or the like. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In the present invention, the polarizer preferably has a water content of 10 to 25% by weight, more preferably 10 to 20% by weight. Controlling the water content in the above range is advantageous in view of optical properties or appearance defect reduction. The polarizer with too low a water content may be easily damaged in the process of laminating the polarizer and the transparent protective film and may suffer from appearance defects such as air bubbles. The polarizer with too high a water content will tend to have poor optical properties.

The water content of the polarizer may be controlled by any suitable method. For example, such a method includes controlling the conditions of the drying step to adjust the water content in the process of manufacturing the polarizer.

The water content of the polarizer can be measured by the following method. The polarizer is cut into a 100×100 mm size sample piece, whose initial weight is measured. The sample piece is then dried at 120° C. for 2 hours, and the dry weight is then measured. The water content is determined from the following formula. Water content (% by weight)={(initial weight−dry weight)/initial weight}×100. The measurement of each weight is performed three times, and the average values are used.

A thin polarizer with a thickness of 10 µm or less may also be used. In view of thickness reduction, the thickness is preferably from 1 to 7 µm. Such a thin polarizer is less uneven in thickness, provides good visibility, and is less dimensionally-variable, and thus has high durability. It is also advantageous in that it can form a thinner polarizing film.

Typical examples of such a thin polarizer include the thin polarizing films described in JP-A-51-069644, JP-A-2000-338329, WO2010/100917, PCT/JP2010/001460, Japanese Patent Application No. 2010-269002, and Japanese Patent Application No. 2010-263692. These thin polarizing films can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Transparent Protective Film>

The transparent protective film used has a low water-vapor permeability of 150 g/m²/24 hours or less. The water-vapor permeability is preferably 140 g/m²/24 hours or less, more preferably 120 g/m²/24 hours or less. The water-vapor permeability can be determined by the method described in the section titled "EXAMPLES."

The thickness of the transparent protective film may be determined as appropriate. The transparent protective film generally has a thickness of about 1 to about 500 µm, preferably 1 to 300 µm, more preferably 5 to 200 µm, in view of strength, workability such as handleability, thin layer formability, or other properties. The thickness of the transparent protective film is even more preferably from 20 to 200 µm, further more preferably from 30 to 80 µm.

Examples of materials that may be used to form the transparent protective film with a satisfactorily low level of water-vapor permeability as mentioned above include polyester resin such as polyethylene terephthalate or polyethylene naphthalate, polycarbonate resin, arylate resin, amide resin such as nylon or aromatic polyamide, polyolefin polymers such as polyethylene, polypropylene, and ethylene-propylene copolymers, cyclic olefin resin having a cyclo-structure or a norbornene structure, (meth)acrylic resin, or any blend thereof. Among these resins, polycarbonate resin, cyclic olefin polymer resin, or (meth)acrylic resin is preferred, and cyclic olefin polymer resin or (meth)acrylic resin is particularly preferred.

For example, the cyclic olefin polymer resin is preferably norbornene resin. Cyclic olefin resin is a generic name for resins produced by polymerization of cyclic olefin used as a polymerizable unit, and examples thereof include the resins described in JP-A-01-240517, JP-A-03-14882, and JP-A-03-122137. Specific examples thereof include ring-opened (co)polymers of cyclic olefins, addition polymers of cyclic olefins, copolymers (typically random copolymers) of cyclic olefin and α-olefin such as ethylene or propylene, graft polymers produced by modification thereof with unsaturated carboxylic acids or derivatives thereof, and hydrides thereof. Examples of the cyclic olefin include norbornene monomers.

Cyclic olefin polymer resins have various commercially available sources. Examples thereof include ZEONEX (trade name) and ZEONOR (trade name) manufactured by ZEON CORPORATION, ARTON (trade name) manufactured by JSR Corporation, TOPAS (trade name) manufactured by Ticona, and APEL (trade name) manufactured by Mitsui Chemicals, Inc.

The (meth)acrylic resin preferably has a glass transition temperature (Tg) of 115° C. or higher, more preferably 120° C. or higher, even more preferably 125° C. or higher, further more preferably 130° C. or higher. If the Tg is 115° C. or higher, the resulting polarizing film can have high durability. The upper limit to the Tg of the (meth)acrylic resin is preferably, but not limited to, 170° C. or lower, in view of formability or the like. The (meth)acrylic resin can form a film with an in-plane retardation (Re) of substantially zero and a thickness direction retardation (Rth) of substantially zero.

Any suitable (meth)acrylic resin may be used as long as the effects of the present invention are not impaired. Examples of such a (meth)acrylic resin include poly(meth)acrylate such as poly(methyl methacrylate), methyl methacrylate-(meth)acrylic acid copolymers, methyl methacrylate-(meth)acrylic ester copolymers, methyl methacrylate-acrylic ester-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly(C1 to C6 alkyl (meth)acrylate) such as poly(methyl (meth)acrylate) is preferred. A methyl methacrylate-based resin composed mainly of a methyl methacrylate unit (50 to 100% by weight, preferably 70 to 100% by weight) is more preferred.

Examples of the (meth)acrylic resin include ACRYPET VH and ACRYPET VRL20A each manufactured by MITSUBISHI RAYON CO., LTD., and the (meth)acrylic resins described in JP-A-2004-70296 including (meth)acrylic resins having a ring structure in their molecule, and high-Tg (meth)acrylic resins obtained by intramolecular crosslinking or intramolecular cyclization reaction.

As the (meth)acrylic resin, lactone ring structure-containing (meth)acrylic resins may also be used. This is because they have high heat resistance and high transparency and also have high mechanical strength after biaxially stretched.

Examples of the lactone ring structure-containing (meth)acrylic resins include the lactone ring structure-containing (meth)acrylic resins described in JP-A-2000-230016, JP-A-2001-151814, JP-A-2002-120326, JP-A-2002-254544, and JP-A-2005-146084.

The low-water-vapor-permeability transparent protective films provided on both front and back sides of the polarizer may be made of the same polymer material or different polymer materials.

A retardation plate having an in-plane retardation of 40 nm or more and/or a thickness direction retardation of 80 nm or more may be used as the transparent protective film. The in-plane retardation is generally controlled to fall within the range of 40 to 200 nm, and the thickness direction retardation is generally controlled to fall within the range of 80 to 300 nm. The use of a retardation plate as the transparent protective film makes it possible to reduce the thickness because the retardation plate also functions as the transparent protective film.

Examples of the retardation plate include a birefringent film produced by uniaxially or biaxially stretching a polymer material, an oriented liquid crystal polymer film, and an oriented liquid crystal polymer layer supported on a film. While the thickness of the retardation plate is also not restricted, it is generally from about 20 to about 150 μm.

Alternatively, a film with a retardation may be bonded to a separate transparent protective film with no retardation, so that the retardation function can be imparted to the transparent protective film.

The surface of the transparent protective film, opposite to its surface where the polarizer is to be bonded, may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the transparent protective film itself or as a layer independent of the transparent protective film.

In the polarizing film, the transparent protective film preferably has an SP value of 29.0 $(MJ/m^3)^{1/2}$ to less than 33.0 $(MJ/m^3)^{1/2}$. When the transparent protective film has an SP value in this range, the tackiness between the transparent protective film and the adhesive layer can be significantly improved because its SP value is very close to the SP value of the radically polymerizable compound (A) in the active energy ray-curable adhesive composition. The transparent protective film with an SP value of 29.0 $(MJ/m^3)^{1/2}$ to less than 33.0 $(MJ/m^3)^{1/2}$ may be made of, for example, saponified triacetylcellulose (e.g., with an SP value of 32.7).

In the polarizing film, the transparent protective film also preferably has an SP value of 18.0 $(MJ/m^3)^{1/2}$ to less than 24.0 $(MJ/m^3)^{1/2}$. When the transparent protective film has an SP value in this range, the tackiness between the transparent protective film and the adhesive layer can be significantly improved because its SP value is very close to the SP value of the radically polymerizable compounds (B) and (C) in the active energy ray-curable adhesive composition. The transparent protective film with an SP value of 18.0 $(MJ/m^3)^{1/2}$ to less than 24.0 $(MJ/m^3)^{1/2}$ may be made of, for example, unsaponified triacetylcellulose (e.g., with an SP value of 23.3).

<Active Energy Ray-Curable Adhesive Composition>

In the polarizing film of the present invention, the polarizer and the transparent protective film with a low water-vapor permeability are bonded using an active energy ray-curable adhesive composition containing a radically polymerizable compound. The adhesive layer (cured product layer) formed by applying active energy rays to the active energy ray-curable adhesive composition has higher durability than aqueous adhesive layers. In the polarizing film of the present invention, the adhesive layer preferably has a Tg of 60° C. or more. The polarizing film of the present invention can have a satisfactory level of durability in a harsh environment at high temperature and high humidity when its adhesive layer is formed using an active energy ray-curable adhesive composition capable of providing a high Tg of 60° C. or more and the thickness of its adhesive layer is adjusted within the above range.

As mentioned above, the radically polymerizable compound for use in the active energy ray-curable adhesive composition is preferably so selected that it can form an adhesive layer with a Tg of 60° C. or more, more preferably 70° C. or more, even more preferably 75° C. or more, further more preferably 100° C. or more, still more preferably 120° C. or more. On the other hand, if the Tg of the adhesive layer is too high, the polarizing film can have lower flexibility. Therefore, the Tg of the adhesive layer is preferably 300° C. or less, more preferably 240° C. or less, even more preferably 180° C. or less.

Examples of the radically polymerizable compound include a (meth)acryloyl group-containing compound and a vinyl group-containing compound. These radically polymerizable compounds may be any of monofunctional, bifunctional or polyfunctional compounds. Among these radically polymerizable compounds, a (meth)acryloyl group-containing compound is preferred. An N-substituted amide monomer is preferably used as the (meth)acryloyl group-containing compound. Such a monomer is advantageous in view of tackiness. As used herein, the term "(meth)acryloyl group" means an acryloyl group and/or a methacryloyl group. In the description, "(meth)" is used in the same meaning.

The N-substituted amide monomer may be represented by general formula (1): $CH_2=C(R^1)-CONR^2(R^3)$, wherein $R^1$ is a hydrogen atom or a methyl group, $R^2$ is a hydrogen atom or a linear or branched alkyl group of 1 to 4 carbon atoms optionally substituted with a hydroxyl group, a mercapto group, an amino group, or a quaternary ammonium group, and $R^3$ is a hydrogen atom or a linear or branched alkyl group of 1 to 4 carbon atoms, provided that not both $R^2$ and $R^3$ are hydrogen atoms, or $R^2$ and $R^3$ are linked to form a five- or six-membered ring optionally containing an oxygen atom. In general formula (1), the linear or branched alkyl group of 1 to 4 carbon atoms for $R^2$ or $R^3$ may be, for example, methyl, ethyl, isopropyl, or tert-butyl, the alkyl group substituted with a hydroxyl group may be hydroxymethyl or hydroxyethyl, and the alkyl group substituted with an amino group may be aminomethyl or aminoethyl. When $R^2$ and $R^3$ are linked to form a five- or six-membered ring optionally containing an oxygen atom, the N-substituted amide monomer has a nitrogen-containing heterocyclic ring. The heterocyclic ring may be a morpholine ring, a piperidine ring, a pyrrolidine ring, or a piperazine ring.

Examples of the N-substituted amide monomer include N-methyl(meth)acrylamide, N,N-dimethyl(meth)acrylamide, N,N-diethyl(meth)acrylamide, N-isopropylacrylamide, N-butyl(meth)acrylamide, N-hexyl(meth)acrylamide, N-methylol(meth)acrylamide, N-hydroxyethyl(meth)acrylamide, N-methylol-N-propane(meth)acrylamide, aminomethyl(meth)acrylamide, aminoethyl(meth)acrylamide, mercaptomethyl(meth)acrylamide, and mercaptoethyl(meth)acrylamide. Examples of the heterocyclic ring-containing monomer include N-acryloylmorpholine, N-acryloylpiperidine, N-methacryloylpiperidine, and N-acryloylpyrrolidine. These N-substituted amide monomers may be used singly or in combination of two or more.

Preferred examples of the N-substituted amide monomer include N-hydroxyethylacrylamide, N-methylolacrylamide, N-isopropylacrylamide, and N-acryloylmorpholine. N-substituted amide monomers can produce good tackiness also to low-water-content polarizers or transparent protective films produced with low water-vapor permeability materials. The monomers listed above can produce particularly good tackiness. In particular, N-hydroxyethylacrylamide is preferred.

These N-substituted amide monomers may be used singly or in combination of two or more. When two or more of them are used in combination, a combination of N-hydroxyethylacrylamide and N-acryloylmorpholine is preferred in view of tackiness. In the case of this combination, the content of N-hydroxyethylacrylamide is preferably 40% by weight or more based on the total weight of N-hydroxyethylacrylamide and N-acryloylmorpholine so that good tackiness can be achieved. The content is more preferably from 40 to 90% by weight, even more preferably from 60 to 90% by weight.

Examples of the radically polymerizable compound, other than the above, are (meth)acryloyl group-containing compounds such as a variety of epoxy (meth)acrylates, urethane (meth)acrylates, polyester (meth)acrylates, and other (meth)acrylate monomers. In particular, epoxy (meth)acrylates, specifically, monofunctional (meth)acrylates having an aromatic ring and a hydroxy group are preferably used. If these radically polymerizable compounds cannot form, by themselves, an adhesive layer with a Tg of 60° C. or more, they should be used in combination with the N-substituted amide monomer.

Any type of monofunctional (meth)acrylate having an aromatic ring and a hydroxy group may be used. The hydroxy group may be present as a substituent on the aromatic ring. In the present invention, however, the hydroxy group is preferably present as part of an organic group (as a moiety bonded to a hydrocarbon group, specifically, an alkylene group) that links the aromatic ring and the (meth)acrylate moiety.

The monofunctional (meth)acrylate having an aromatic ring and a hydroxy group may be, for example, a product of reaction between (meth)acrylic acid and a monofunctional epoxy compound having an aromatic ring. Examples of such a monofunctional epoxy compound having an aromatic ring include phenyl glycidyl ether, tert-butylphenyl glycidyl ether, and phenyl polyethylene glycol glycidyl ether. Examples of the monofunctional (meth)acrylate having an aromatic ring and a hydroxy group include 2-hydroxy-3-phenoxypropyl (meth)acrylate, 2-hydroxy-3-tert-butylphenoxypropyl (meth)acrylate, and 2-hydroxy-3-phenyl polyethylene glycol propyl (meth)acrylate.

The (meth)acryloyl group-containing compound may also be a carboxyl group-containing monomer. Carboxyl group-containing monomers are also preferred in view of tackiness. Examples of carboxyl group-containing monomers include (meth)acrylic acid, carboxyethyl (meth)acrylate, and carboxypentyl (meth)acrylate. In particular, acrylic acid is preferred.

Besides the above, (meth)acryloyl group-containing compounds include C1 to C12 alkyl (meth)acrylates such as methyl (meth)acrylate, ethyl (meth)acrylate, n-butyl (meth)acrylate, 2-ethylhexyl (meth)acrylate, isooctyl (meth)acrylate, isononyl (meth)acrylate, and lauryl (meth)acrylate; alkoxyalkyl (meth)acrylate monomers such as methoxyethyl (meth)acrylate and ethoxyethyl (meth)acrylate; hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate. Examples also include nitrogen-containing monomers such as (meth)acrylamide; maleimide, N-cyclohexylmaleimide, N-phenylmaleimide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyridinyl)propyl (meth)acrylate; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

As mentioned above, the N-substituted amide monomer is preferably used alone as the radically polymerizable compound to form the active energy ray-curable adhesive composition, or the N-substituted amide monomer and the monofunctional (meth)acrylate having an aromatic ring and a hydroxy group are preferably used together as the radically polymerizable compound to form the active energy ray-curable adhesive composition. When these monomers are used in combination, the content of the N-substituted amide monomer is preferably 40% by weight or more, more preferably 50% by weight or more, even more preferably 60% by weight or more, further more preferably 70% by weight or more, still more preferably 80% by weight or more.

The radically polymerizable compound may be a bifunctional or polyfunctional radically polymerizable compound. The bifunctional or polyfunctional radically polymerizable compound is preferably a bifunctional or polyfunctional (meth)acrylate, in particular preferably a bifunctional or polyfunctional epoxy (meth)acrylate. The bifunctional or polyfunctional epoxy (meth)acrylate can be obtained by reaction between (meth)acrylic acid and a polyfunctional epoxy compound. The polyfunctional epoxy compound may be of any type. The polyfunctional epoxy compound may be, for example, an aromatic epoxy resin, an alicyclic epoxy resin, or an aliphatic epoxy resin.

Examples of aromatic epoxy resins include bisphenol epoxy resins such as bisphenol A diglycidyl ether, bisphenol F diglycidyl ether, and bisphenol S diglycidyl ether; novolac epoxy resins such as phenol novolac epoxy resins, cresol novolac epoxy resins, and hydroxybenzaldehyde phenol novolac epoxy resins; and polyfunctional epoxy resins such as tetrahydroxyphenylmethane glycidyl ether, tetrahydroxybenzophenone glycidyl ether, and epoxidized polyvinyl phenol.

Examples of alicyclic epoxy resins include hydrogenation products of the above aromatic epoxy resins, cyclohexane type epoxy resins, cyclohexyl methyl ester type epoxy resins, cyclohexyl methyl ether type epoxy resins, spiro type epoxy resins, and tricyclodecane type epoxy resins.

Examples of aliphatic epoxy resins include polyglycidyl ethers of aliphatic polyhydric alcohols or alkylene oxide adducts thereof. Examples thereof include 1,4-butanediol diglycidyl ether, 1,6-hexanediol diglycidyl ether, glycerol triglycidyl ether, trimethylolpropane triglycidyl ether, polyethylene glycol diglycidyl ether, propylene glycol diglycidyl ether, and polyether polyol polyglycidyl ethers produced by adding one or more alkylene oxides (such as ethylene oxide and propylene oxide) to an aliphatic polyhydric alcohol such as ethylene glycol, propylene glycol, or glycerol.

The epoxy resin generally has an epoxy equivalent of 30 to 3,000 g/equivalent, preferably 50 to 1,500 g/equivalent.

The bifunctional or polyfunctional epoxy (meth)acrylate is preferably an epoxy (meth)acrylate of an aliphatic epoxy resin, in particular preferably an epoxy (meth)acrylate of a bifunctional aliphatic epoxy resin.

The active energy ray-curable adhesive composition used to form the polarizing film of the present invention preferably contains 20 to 60% by weight of (A) a radically polymerizable compound with an SP value of 29.0 $(MJ/m^3)^{1/2}$ to 32.0 $(MJ/m^3)^{1/2}$, 10 to 30% by weight of (B) a radically polymerizable compound with an SP value of 18.0 $(MJ/m^3)^{1/2}$ to less than 21.0 $(MJ/m^3)^{1/2}$, and 20 to 60% by weight of (C) a radically polymerizable compound with an SP value of 21.0 $(MJ/m^3)^{1/2}$ to 23.0 $(MJ/m^3)^{1/2}$, based on 100% by weight of the total amount of the composition. As used herein, the term "the total amount of the composition" means the amount of all the components, which may include not only the radically polymerizable compounds but also any of various initiators and additives.

In the active energy ray-curable adhesive composition, the content of the radically polymerizable compound (A), which has an SP value of 29.0 $(MJ/m^3)^{1/2}$ to 32.0 $(MJ/m^3)^{1/2}$, is preferably from 20 to 60% by weight based on 100% by weight of the total amount of the composition. The radically polymerizable compound (A), which has a relatively high SP value, can significantly contribute to the improvement of the tackiness, for example, between a PVA-based polarizer (e.g., with a SP value of 32.8) and the adhesive layer. On the other hand, the SP value of the radically polymerizable compound (A) is relatively close to that of water (47.9 in SP value), and therefore, if the content of the radically polymerizable compound (A) in the composition is too high, the resulting adhesive layer may have poor water resistance. In view of water resistance and the tackiness to the polarizer, the content of the radically polymerizable compound (A) is preferably from 20 to 60% by weight. In view of tackiness, the content of the radically polymerizable compound (A) is preferably 25% by weight or more, more preferably 30% by weight or more. In view of water resistance, the content of the radically polymerizable compound (A) is preferably 55% by weight or less, more preferably 50% by weight or less.

The content of the radically polymerizable compound (B), which has an SP value of 18.0 $(MJ/m^3)^{1/2}$ to less than 21.0 $(MJ/m^3)^{1/2}$, is preferably from 10 to 30% by weight. The radically polymerizable compound (B), which has a relatively low SP value significantly different from that of water (47.9 in SP value), can significantly contribute to the improvement of the water resistance of the adhesive layer. The SP value of the radically polymerizable compound (B) is close to the SP value of a low-water-vapor-permeability, cyclic olefin polymer resin (e.g., ZEONOR (trade name) manufactured by ZEON CORPORATION) (e.g., with an SP value of 18.6). Therefore, the radically polymerizable compound (B) can contribute to the improvement of tackiness to such a low-water-vapor-permeability, transparent productive film. For further improvement of the water resistance of the adhesive layer, the radically polymerizable compound (B) preferably has an SP value of less than 20.0 $(MJ/m^3)^{1/2}$. On the other hand, the SP value of the radically polymerizable compound (B) significantly differs from that of the radically polymerizable compound (A), and therefore, if the content of the radically polymerizable compound (B) is too high, the compatibility balance between the radically polymerizable compounds may be destroyed, so that phase separation may proceed to decrease the transparency of the adhesive layer. In view of water resistance and the transparency of the adhesive layer, therefore, it is important to set the content of the radically polymerizable compound (B) at 10 to 30% by weight. In view of water resistance, the content of the radically polymerizable compound (B) is preferably 10% by weight or more, more preferably 15% by weight or more. In view of the transparency of the adhesive layer, the content of the radically polymerizable compound (B) is preferably 25% by weight or less, more preferably 20% by weight or less, and its SP value is preferably 19.0 $(MJ/m^3)^{1/2}$ or more.

The content of the radically polymerizable compound (C), which should have an SP value of 21.0 $(MJ/m^3)^{1/2}$ to less than 23.0 $(MJ/m^3)^{1/2}$, is preferably from 20 to 60% by weight. As mentioned above, the radically polymerizable compounds (A) and (B) have significantly different SP values and low compatibility with each other. However, the SP value of the radically polymerizable compound (C) is between the SP values of the radically polymerizable compounds (A) and (B), and therefore, the use of the radically polymerizable compounds (A) and (B) in combination with the radically polymerizable compound (C) makes it possible to improve the compatibility between all the components of the composition in a well-balanced manner. In addition, the SP value of the radically polymerizable compound (C) is close to the SP value (e.g., 22.2) of, for example, a low-water-vapor-permeability acrylic film for the transparent protective film and therefore can contribute to the improvement of the tackiness to such a low-water-vapor-permeability transparent protective film. Therefore, to improve water resistance and tackiness in a well-balanced manner, the content of the radically polymerizable compound (C) is preferably from 20 to 60% by weight. In view of the compatibility between all the components of the composition and the tackiness to the low-water-vapor-permeability transparent protective film, the content of the radically polymerizable compound (C) is preferably 25% by weight or more, more preferably 29% by weight or more. In view of water resistance, the content of the radically polymerizable compound (C) is preferably 55% by weight or less, more preferably 50% by weight or less.

The radically polymerizable compounds (A), (B), and (C) are each preferably capable of forming a homopolymer with a glass transition temperature (Tg) of 60° C. or more, so that particularly good durability can be achieved and heat shock cracking can be prevented. As used herein, the term "heat shock cracking" means a phenomenon in which a polarizer tears in the stretched direction, for example, when it shrinks. To prevent this phenomenon, it is important to suppress the expansion and shrinkage of the polarizer in the heat shock temperature range (−40° C. to 60° C.). When the radically polymerizable compounds (A), (B), and (C) are each capable of forming a homopolymer with a glass transition temperature (Tg) of 60° C. or more as mentioned above, the adhesive layer formed using these compounds can also have a high Tg. This makes it possible to prevent a sharp change in the elastic modulus of the adhesive layer in the heat shock temperature range and to reduce the expansion or shrinkage force on the polarizer, so that heat shock cracking can be prevented.

Hereinafter, a method for calculating the SP value (solubility parameter) in the present invention will be described below.

(Method for Calculating the Solubility Parameter (SP Value))

In the present invention, the solubility parameters (SP values) of the radically polymerizable compound, the polarizer, and various types of transparent protective films can be calculated using the Fedors method (see Polymer Eng. & Sci., Vol. 14, No. 2 (1974), pp. 148-154). Specifically, it can be calculated from the following mathematical formula:

$$\delta = \left[\frac{\sum_i \Delta e_i}{\sum_i \Delta v_i}\right]^{1/2} \quad \text{[Mathematical 1]}$$

wherein Δei is the evaporation energy of an atom or group at 25° C., and Δvi is its molar volume at 25° C.

In the mathematical formula, constant values for each of i atoms and groups in the main molecule are substituted for Δei and Δvi. Table 1 below shows Δe and Δv values for typical atoms or groups.

TABLE 1

| Atom or group | Δe (J/mol) | Δv (cm³/mol) |
|---|---|---|
| $CH_3$ | 4086 | 33.5 |
| C | 1465 | −19.2 |
| Phenyl | 31940 | 71.4 |
| Phenylene | 31940 | 52.4 |
| COOH | 27628 | 28.5 |
| $CONH_2$ | 41861 | 17.5 |
| $NH_2$ | 12558 | 19.2 |
| —N= | 11721 | 5.0 |
| CN | 25535 | 24.0 |
| $NO_2$ (fatty acid) | 29302 | 24.0 |
| $NO_3$ (aromatic) | 15363 | 32.0 |
| O | 3349 | 3.8 |
| OH | 29805 | 10.0 |
| S | 14149 | 12.0 |
| F | 4186 | 18.0 |
| Cl | 11553 | 24.0 |
| Br | 15488 | 30.0 |

The radically polymerizable compound (A) may be any compound having a radically polymerizable group such as a (meth)acrylate group and having an SP value of 29.0 (MJ/m³)$^{1/2}$ to 32.0 (MJ/m³)$^{1/2}$. Examples of the radically polymerizable compound (A) include N-hydroxyethylacrylamide (29.6 in SP value) and N-methylolacrylamide (31.5 in SP value).

The radically polymerizable compound (B) may be any compound having a radically polymerizable group such as a (meth)acrylate group and having an SP value of 18.0 (MJ/m³)$^{1/2}$ to less than 21.0 (MJ/m³)$^{1/2}$. Examples of the radically polymerizable compound (B) include tripropylene glycol diacrylate (19.0 in SP value), 1,9-nonanediol diacrylate (19.2 in SP value), tricyclodecane dimethanol diacrylate (20.3 in SP value), cyclic trimethylolpropane formal acrylate (19.1 in SP value), dioxane glycol diacrylate (19.4 in SP value), and EO-modified diglycerol tetraacrylate (20.9 in SP value). The radically polymerizable compound (B) may be advantageously a commercially available product, examples of which include Aronix M-220 (manufactured by Toagosei Co., Ltd., 19.0 in SP value), LIGHT ACRYLATE 1,9ND-A (manufactured by Kyoeisha Chemical Co., Ltd., 19.2 in SP value), LIGHT ACRYLATE DGE-4A (manufactured by Kyoeisha Chemical Co., Ltd., 20.9 in SP value), LIGHT ACRYLATE DCP-A (manufactured by Kyoeisha Chemical Co., Ltd., 20.3 in SP value), SR-531 (manufactured by Sartomer, 19.1 in SP value), and CD-536 (manufactured by Sartomer, 19.4 in SP value).

The radically polymerizable compound (C) may be any compound having a radically polymerizable group such as a (meth)acrylate group and having an SP value of 21.0 (MJ/m³)$^{1/2}$ to 23.0 (MJ/m³)$^{1/2}$. Examples of the radically polymerizable compound (C) include acryloylmorpholine (22.9 in SP value), N-methoxymethylacrylamide (22.9 in SP value), and N-ethoxymethylacrylamide (22.3 in SP value). The radically polymerizable compound (C) may be advantageously a commercially available product, examples of which include ACMO (manufactured by KOHJIN Film & Chemicals Co., Ltd., 22.9 in SP value), WASMER 2MA (manufactured by Kasano Kosan Co., Ltd., 22.9 in SP value), WASMER EMA (manufactured by Kasano Kosan Co., Ltd., 22.3 in SP value), and WASMER 3MA (manufactured by Kasano Kosan Co., Ltd., 22.4 in SP value).

When the radically polymerizable compounds (A), (B), and (C) are each capable of forming a homopolymer with a glass transition temperature (Tg) of 60° C. or more, the resulting adhesive layer can also have a high Tg and particularly high durability. This makes it possible to prevent heat shock cracking of the polarizer, for example, when the compounds are used to form the adhesive layer between the polarizer and a low-water-vapor-permeability transparent protective film. Herein, the Tg of a homopolymer of the radically polymerizable compound means the Tg of a product that can be obtained by curing (polymerizing) the radically polymerizable compound alone. How to measure the Tg will be described below.

In the present invention, the active energy ray-curable adhesive composition may further contain 0 to 15 parts by weight of (D) a radically polymerizable compound with an SP value of more than 23.0 (MJ/m³)$^{1/2}$ to less than 29.0 (MJ/m³)$^{1/2}$ when it contains 85 to 100 parts by weight of the total of the radically polymerizable compounds (A), (B), and (C). Examples of the radically polymerizable compound (D) include 4-hydroxybutyl acrylate (23.8 in SP value), 2-hydroxyethyl acrylate (25.5 in SP value), N-vinylcaprolactam (V-CAP (trade name) manufactured by ISP Investments Inc., 23.4 in SP value), and 2-hydroxypropyl acrylate (24.5 in SP value).

According to this feature, the content of each of the radically polymerizable compounds (A), (B), and (C) in the adhesive composition can be a sufficient level, so that the resulting adhesive layer can have an improved level of tackiness and a more improved level of durability and water resistance. The adhesive composition preferably contains 90 to 100 parts by weight, more preferably 95 to 100 parts by weight of the total of the radically polymerizable compounds (A), (B), and (C) so that the tackiness, durability, and water resistance can be further improved in a well-balanced manner.

In the polarizing film of the present invention, the active energy ray-curable adhesive composition preferably further contains (D) a radically polymerizable compound having an active methylene group and (E) a radical polymerization initiator having a hydrogen-withdrawing function. This feature can provide significantly improved tackiness for the adhesive layer of the polarizing film even immediately after the polarizing film is particularly taken out of a high-humidity environment or water (undried state). Although the reason for this is not clear, the following factors can be considered. The radically polymerizable compound (D) having an active methylene group can be polymerized together with other radically polymerizable compounds used to form the adhesive layer. During the polymerization for forming the adhesive layer, the radically polymerizable compound (D) having an active methylene group can be incorporated into the main chain and/or the side chain of the base polymer in the adhesive layer. When the radical polymerization initiator (E) having a hydrogen-withdrawing function is present in this polymerization process, hydrogen can be withdrawn from the radically polymerizable compound (D) having an active methylene group so that a radical can be generated on the methylene group in the process of forming the base polymer for the adhesive layer. The radical-carrying methylene group can react with hydroxyl groups in the polarizer made of PVA or the like, so that covalent bonds can be formed between the adhesive layer and the polarizer. This may result in a significant improvement in the tackiness of the adhesive layer of the polarizing film particularly even in an undried state.

The radically polymerizable compound (D) having an active methylene group should be a compound having an active double-bond group such as a (meth)acrylic group at its end or in its molecule and also having an active methylene group. For example, the active methylene group may be an acetoacetyl group, an alkoxymalonyl group, or a cyanoacetyl group. Examples of the radically polymerizable compound (D) having an active methylene group include acetoacetoxyalkyl (meth)acrylates such as 2-acetoacetoxyethyl (meth)acrylate, 2-acetoacetoxypropyl (meth)acrylate, and 2-acetoacetoxy-1-methylethyl (meth)acrylate; 2-ethoxymalonyloxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radically polymerizable compound (D) having an active methylene group may have any SP value.

In the present invention, for example, the radical polymerization initiator (E) having a hydrogen-withdrawing function may be a thioxanthone radical polymerization initiator or a benzophenone radical polymerization initiator. For example, the thioxanthone radical polymerization initiator is a compound represented by general formula (1) below:

[Formula 3]

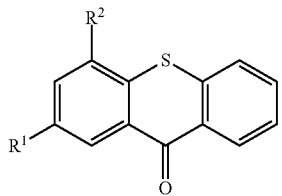

(1)

wherein $R^1$ and $R^2$ each represent —H, —CH$_2$CH$_3$, -i-Pr, or Cl, and $R^1$ and $R^2$ may be the same or different. Examples of the compound of general formula (1) include thioxanthone, dimethyl thioxanthone, diethyl thioxanthone, isopropyl thioxanthone, and chlorothioxanthone. In particular, the compound of general formula (1) is preferably diethyl thioxanthone in which $R^1$ and $R^2$ are each —CH$_2$CH$_3$.

In the present invention, as described above, the reaction of the radically polymerizable compound (D) having an active methylene group in the presence of the radical polymerization initiator (E) having a hydrogen-withdrawing function produces a radical on the methylene group, which reacts with the hydroxyl group in the polarizer made of PVA or the like to form a covalent bond. Thus to produce a radical on the methylene group of the radically polymerizable compound (D) having an active methylene group so that the covalent bond can be sufficiently formed, the composition preferably contains 1 to 50% by weight of the radically polymerizable compound (D) having an active methylene group and 0.1 to 1.0% by weight of the radical polymerization initiator (F), and more preferably contains 3 to 30% by weight of the radically polymerizable compound (D) having an active methylene group and 0.3 to 9% by weight of the radical polymerization initiator (F), based on 100% by weight of the total amount of the composition. If the content of the radically polymerizable compound (D) having an active methylene group is less than 1% by weight, the effect of increasing the tackiness in an undried state can be low, and water resistance may fail to improve sufficiently. If it is more than 50% by weight, the adhesive layer may be insufficiently cured. If the content of the radical polymerization initiator (E) having a hydrogen-withdrawing function is less than 0.1% by weight, the hydrogen-withdrawing reaction may fail to proceed sufficiently. If it is more than 10% by weight, the initiator (E) may fail to dissolve completely in the composition.

In the present invention, the active energy ray-curable adhesive composition may contain a photo-acid generator. In this case, the resulting adhesive layer can have a significantly higher level of water resistance and durability than that in the case where the composition contains no photo-acid generator. The photo-acid generator (F) may be represented by general formula (3) below.

General Formula (3):

$$L^+X^-$$ [Formula 4]

wherein $L^+$ represents any onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

A preferred onium cation structure of the onium cation $L^+$ in general formula (3) is selected from those of general formulae (4) to (12) below.

General Formula (4):

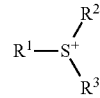

[Formula 5]

General Formula (5):

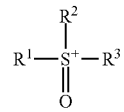

[Formula 6]

General Formula (6):

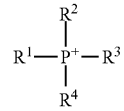

[Formula 7]

General Formula (7):

[Formula 8]

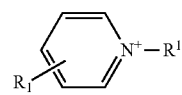

General Formula (8):

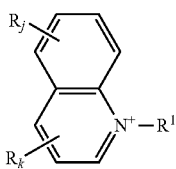

[Formula 9]

General Formula (9):

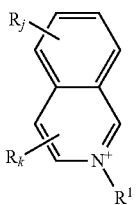

[Formula 10]

General Formula (10):

[Formula 11]

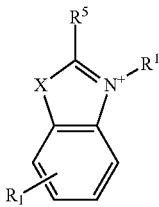

General Formula (11):

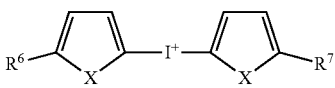

[Formula 12]

General Formula (12):

Ar$^4$—I$^+$—Ar$^5$

In General formulae (4) to (12), $R^1$, $R^2$, and $R^3$ each independently represent a group selected from a hydrogen atom, a substituted or unsubstituted alkyl group, a substituted or unsubstituted alkenyl group, a substituted or unsubstituted aryl group, a substituted or unsubstituted heterocyclic group, a substituted or unsubstituted alkoxyl group, a substituted or unsubstituted aryloxy group, a substituted or unsubstituted heterocyclic oxy group, a substituted or unsubstituted acyl group, a substituted or unsubstituted carbonyloxy group, a substituted or unsubstituted oxycarbonyl group, or a halogen atom, $R^4$ has the same meaning as defined for $R^1$, $R^2$, and $R^3$, $R^5$ represents a substituted or unsubstituted alkyl group or a substituted or unsubstituted alkylthio group, $R^6$ and $R^7$ each independently represent a substituted or unsubstituted alkyl group or a substituted or unsubstituted alkoxyl group, R represents a halogen atom, a hydroxyl group, a carboxyl group, a mercapto group, a cyano group, a nitro group, a substituted or unsubstituted carbamoyl group, a substituted or unsubstituted alkyl group, a substituted or unsubstituted alkenyl group, a substituted or unsubstituted aryl group, a substituted or unsubstituted heterocyclic group, a substituted or unsubstituted alkoxyl group, a substituted or unsubstituted aryloxy group, a substituted or unsubstituted heterocyclic oxy group, a substituted or unsubstituted alkylthio group, a substituted or unsubstituted arylthio group, a substituted or unsubstituted heterocyclic thio group, a substituted or unsubstituted acyl group, a substituted or unsubstituted carbonyloxy group, or a substituted or unsubstituted oxycarbonyl group, Ar$^4$ and Ar$^5$ each represent a substituted or unsubstituted aryl group or a substituted or unsubstituted heterocyclic group, X represents an oxygen or sulfur atom, i represents an integer of 0 to 5, j represents an integer of 0 to 4, k represents an integer of 0 to 3, and adjacent R moieties, Ar$^4$ and Ar$^5$, $R^2$ and $R^3$, $R^2$ and $R^4$, $R^3$ and $R^4$, $R^1$ and $R^2$, $R^1$ and $R^3$, $R^1$ and $R^4$, $R^1$ and R, or $R^1$ and $R^5$ may be linked together to form a cyclic structure.

Examples of the onium cation (sulfonium cation) corresponding to general formula (4) include, but are not limited to, dimethyl phenyl sulfonium, dimethyl(o-fluorophenyl) sulfonium, dimethyl(m-chlorophenyl)sulfonium, dimethyl (p-bromophenyl)sulfonium, dimethyl(p-cyanophenyl)sulfonium, dimethyl(m-nitrophenyl)sulfonium, dimethyl(2,4,6-tribromophenyl)sulfonium, dimethyl(pentafluorophenyl) sulfonium, dimethyl(p-(trifluoromethyl)phenyl)sulfonium, dimethyl(p-hydroxyphenyl)sulfonium, dimethyl(p-mercaptophenyl)sulfonium, dimethyl(p-methylsulfinylphenyl)sulfonium, dimethyl(p-methylsulfonylphenyl)sulfonium, dimethyl(o-acetylphenyl)sulfonium, dimethyl(o-benzoylphenyl)sulfonium, dimethyl(p-methylphenyl) sulfonium, dimethyl(p-isopropylphenyl)sulfonium, dimethyl(p-octadecylphenyl)sulfonium, dimethyl(p-cyclohexylphenyl)sulfonium, dimethyl(p-methoxyphenyl)sulfonium, dimethyl(o-methoxycarbonylphenyl)sulfonium, dimethyl(p-phenylsulfanylphenyl)sulfonium, (7-methoxy-2-oxo-2H-chromen-4-yl)dimethyl sulfonium, (4-methoxynaphthalene-1-yl)dimethyl sulfonium, dimethyl (p-isopropoxycarbonylphenyl)sulfonium, dimethyl(2-naphthyl)sulfonium, dimethyl(9-anthryl)sulfonium, diethyl phenyl sulfonium, methyl ethyl phenyl sulfonium, methyl diphenyl sulfonium, triphenyl sulfonium, diisopropyl phenyl sulfonium, diphenyl(4-phenylsulfanyl-phenyl)-sulfonium, 4,4'-bis(diphenyl sulfonium)diphenyl sulfide, 4,4'-bis[di[(4-(2-hydroxy-ethoxy)-phenyl)]sulfonium]]diphenyl sulfide, 4,4'-bis(diphenyl sulfonium)biphenylene, diphenyl(o-fluorophenyl)sulfonium, diphenyl(m-chlorophenyl)sulfonium, diphenyl(p-bromophenyl)sulfonium, diphenyl(p-cyanophenyl)sulfonium, diphenyl(m-nitrophenyl)sulfonium, diphenyl(2,4,6-tribromophenyl)sulfonium, diphenyl(pentafluorophenyl)sulfonium, diphenyl(p-(trifluoromethyl)phenyl) sulfonium, diphenyl(p-hydroxyphenyl)sulfonium, diphenyl (p-mercaptophenyl)sulfonium, diphenyl(p-methylsulfinylphenyl)sulfonium, diphenyl(p-methylsulfonylphenyl)sulfonium, diphenyl(o-acetylphenyl) sulfonium, diphenyl(o-benzoylphenyl)sulfonium, diphenyl (p-methylphenyl)sulfonium, diphenyl(p-isopropylphenyl) sulfonium, diphenyl(p-octadecylphenyl)sulfonium, diphenyl(p-cyclohexylphenyl)sulfonium, diphenyl(p-methoxyphenyl)sulfonium, diphenyl(o-methoxycarbonylphenyl)sulfonium, diphenyl(p-phenylsulfanylphenyl)sulfonium, (7-methoxy-2-oxo-2H-chromen-4-yl)diphenyl sulfonium, (4-methoxynaphthalene-1-yl)diphenyl sulfonium, diphenyl(p-isopropoxycarbonylphenyl)sulfonium, diphenyl(2-naphthyl)sulfonium, diphenyl(9-anthryl)sulfonium, ethyl diphenyl sulfonium, methyl ethyl (o-tolyl)sulfonium, methyl di(p-tolyl)sulfonium, tri(p-tolyl)sulfonium, diisopropyl(4-phenylsulfanylphenyl)sulfonium, diphenyl(2-thienyl)sulfonium, diphenyl(2-furyl)sulfonium, and diphenyl(9-ethyl-9H-carbazol-3-yl)sulfonium.

Examples of the onium cation (sulfoxonium cation) corresponding to general formula (5) include, but are not limited to, dimethyl phenyl sulfoxonium, dimethyl(o-fluorophenyl)sulfoxonium, dimethyl(m-chlorophenyl)sulfoxonium, dimethyl(p-bromophenyl)sulfoxonium, dimethyl(p-cyanophenyl)sulfoxonium, dimethyl(m-nitrophenyl)sulfoxonium, dimethyl(2,4,6-tribromophenyl)sulfoxonium, dimethyl(pentafluorophenyl)sulfoxonium, dimethyl(p-(trifluoromethyl)phenyl)sulfoxonium, dimethyl(p-hydroxyphenyl)sulfoxonium, dimethyl(p-mercaptophenyl)sulfoxonium, dimethyl(p-methylsulfinylphenyl)sulfoxonium, dimethyl(p-methylsulfonylphenyl)sulfoxonium, dimethyl(o-acetylphenyl)sulfoxonium, dimethyl(o-benzoylphenyl)sulfoxonium, dimethyl(p-methylphenyl)sulfoxonium, dimethyl(p-isopropylphenyl)sulfoxonium, dimethyl(p-octadecylphenyl)sulfoxonium, dimethyl(p-cyclohexylphenyl)sulfoxonium, dimethyl(p-methoxyphenyl)sulfoxonium, dimethyl(o-methoxycarbonylphenyl)sulfoxonium, dimethyl(p-phenylsulfanylphenyl)sulfoxonium, (7-methoxy-2-oxo-2H-chromen-4-yl)dimethyl sulfoxonium, (4-methoxynaphthalene-1-yl)dimethyl sulfoxonium, dimethyl(p-isopropoxycarbonylphenyl)sulfoxonium, dimethyl(2-naphthyl)sulfoxonium, dimethyl(9-anthryl)sulfoxonium, diethyl phenyl sulfoxonium, methyl ethyl phenyl sulfoxonium, methyl diphenyl sulfoxonium, triphenyl sulfoxonium, diisopropyl phenyl sulfoxonium, diphenyl(4-phenylsulfanyl-phenyl)-sulfoxonium, 4,4'-bis(diphenyl sulfoxonium)diphenyl sulfide, 4,4'-bis[di[(4-(2-hydroxy-ethoxy)-phenyl)]sulfoxonium]]diphenyl sulfide, 4,4'-bis(diphenyl sulfoxonium)biphenylene, diphenyl(o-fluorophenyl)sulfoxonium, diphenyl(m-chlorophenyl)sulfoxonium, diphenyl(p-bromophenyl)sulfoxonium, diphenyl(p-cyanophenyl)sulfoxonium, diphenyl(m-nitrophenyl)sulfoxonium, diphenyl(2,4,6-tribromophenyl)sulfoxonium, diphenyl(pentafluorophenyl)sulfoxonium, diphenyl(p-(trifluoromethyl)phenyl)sulfoxonium, diphenyl(p-hydroxyphenyl)sulfoxonium, diphenyl(p-mercaptophenyl)sulfoxonium, diphenyl(p-methylsulfinylphenyl)sulfoxonium, diphenyl(p-methylsulfonylphenyl)sulfoxonium, diphenyl(o-acetylphenyl)sulfoxonium, diphenyl(o-benzoylphenyl)sulfoxonium, diphenyl(p-methylphenyl)sulfoxonium, diphenyl(p-isopropylphenyl)sulfoxonium, diphenyl(p-octadecylphenyl)sulfoxonium, diphenyl(p-cyclohexylphenyl)sulfoxonium, diphenyl(p-methoxyphenyl)sulfoxonium, diphenyl(o-methoxycarbonylphenyl)sulfoxonium, diphenyl(p-phenylsulfanylphenyl)sulfoxonium, (7-methoxy-2-oxo-2H-chromen-4-yl)diphenyl sulfoxonium, (4-methoxynaphthalene-1-yl)diphenyl sulfoxonium, diphenyl(p-isopropoxycarbonylphenyl)sulfoxonium, diphenyl(2-naphthyl)sulfoxonium, diphenyl(9-anthryl)sulfoxonium, ethyl diphenyl sulfoxonium, methyl ethyl (o-tolyl)sulfoxonium, methyl di(p-tolyl)sulfoxonium, tri(p-tolyl)sulfoxonium, diisopropyl(4-phenylsulfanylphenyl)sulfoxonium, diphenyl(2-thienyl)sulfoxonium, diphenyl(2-furyl)sulfoxonium, and diphenyl(9-ethyl-9H-carbazol-3-yl)sulfoxonium.

Examples of the onium cation (phosphonium cation) corresponding to general formula (6) include, but are not limited to, trimethyl phenyl phosphonium, triethyl phenyl phosphonium, tetraphenyl phosphonium, triphenyl(p-fluorophenyl)phosphonium, triphenyl(o-chlorophenyl)phosphonium, triphenyl(m-bromophenyl)phosphonium, triphenyl(p-cyanophenyl)phosphonium, triphenyl(m-nitrophenyl) phosphonium, triphenyl(p-phenylsulfanylphenyl)phosphonium, (7-methoxy-2-oxo-2H-chromen-4-yl)triphenyl phosphonium, triphenyl(o-hydroxyphenyl)phosphonium, triphenyl(o-acetylphenyl)phosphonium, triphenyl(m-benzoylphenyl)phosphonium, triphenyl(p-methylphenyl)phosphonium, triphenyl(p-isopropoxyphenyl)phosphonium, triphenyl(o-methoxycarbonylphenyl)phosphonium, triphenyl(1-naphthyl)phosphonium, triphenyl(9-anthryl)phosphonium, triphenyl(2-thienyl)phosphonium, triphenyl(2-furyl)phosphonium, and triphenyl(9-ethyl-9H-carbazol-3-yl)phosphonium.

Examples of the onium cation (pyridinium cation) corresponding to general formula (7) include, but are not limited to, N-phenylpyridinium, N-(o-chlorophenyl)pyridinium, N-(m-chlorophenyl)pyridinium, N-(p-cyanophenyl)pyridinium, N-(o-nitrophenyl)pyridinium, N-(p-acetylphenyl)pyridinium, N-(p-isopropylphenyl)pyridinium, N-(p-octadecyloxyphenyl)pyridinium, N-(p-methoxycarbonylphenyl)pyridinium, N-(9-anthryl)pyridinium, 2-chloro-1-phenylpyridinium, 2-cyano-1-phenylpyridinium, 2-methyl-1-phenylpyridinium, 2-vinyl-1-phenylpyridinium, 2-phenyl-1-phenylpyridinium, 1,2-diphenylpyridinium, 2-methoxy-1-phenylpyridinium, 2-phenoxy-1-phenylpyridinium, 2-acetyl-1-(p-tolyl)pyridinium, 2-methoxycarbonyl-1-(p-tolyl)pyridinium, 3-fluoro-1-naphthylpyridinium, 4-methyl-1-(2-furyl)pyridinium, N-methylpyridinium, and N-ethylpyridinium.

Examples of the onium cation (quinolinium cation) corresponding to general formula (8) include, but are not limited to, N-methylquinolinium, N-ethylquinolinium, N-phenylquinolinium, N-naphthylquinolinium, N-(o-chlorophenyl)quinolinium, N-(m-chlorophenyl)quinolinium, N-(p-cyanophenyl)quinolinium, N-(o-nitrophenyl)quinolinium, N-(p-acetylphenyl)quinolinium, N-(p-isopropylphenyl)quinolinium, N-(p-octadecyloxyphenyl)quinolinium, N-(p-methoxycarbonylphenyl)quinolinium, N-(9-anthryl)quinolinium, 2-chloro-1-phenylquinolinium, 2-cyano-1-phenylquinolinium, 2-methyl-1-phenylquinolinium, 2-vinyl-1-phenylquinolinium, 2-phenyl-1-phenylquinolinium, 1,2-diphenylquinolinium, 2-methoxy-1-phenylquinolinium, 2-phenoxy-1-phenylquinolinium, 2-acetyl-1-phenylquinolinium, 2-methoxycarbonyl-1-phenylquinolinium, 3-fluoro-1-phenylquinolinium, 4-methyl-1-phenylquinolinium, 2-methoxy-1-(p-tolyl)quinolinium, 2-phenoxy-1-(2-furyl)quinolinium, 2-acetyl-1-(2-thienyl)quinolinium, 2-methoxycarbonyl-1-methylquinolinium, 3-fluoro-1-ethylquinolinium, and 4-methyl-1-isopropylquinolinium.

Examples of the onium cation (isoquinolinium cation) corresponding to general formula (9) include, but are not limited to, N-phenylisoquinolinium, N-methylisoquinolinium, N-ethylisoquinolinium, N-(o-chlorophenyl)isoquinolinium, N-(m-chlorophenyl)isoquinolinium, N-(p-cyanophenyl)isoquinolinium, N-(o-nitrophenyl)isoquinolinium, N-(p-acetylphenyl)isoquinolinium, N-(p-isopropylphenyl)isoquinolinium, N-(p-octadecyloxyphenyl)isoquinolinium, N-(p-methoxycarbonylphenyl)isoquinolinium, N-(9-anthryl)isoquinolinium, 1,2-diphenylisoquinolinium, N-(2-furyl)isoquinolinium, N-(2-thienyl)isoquinolinium, and N-naphthylisoquinolinium.

Examples of the onium cation (benzoxazolium cation) corresponding to general formula (10) include, but are not limited to, N-methylbenzoxazolium, N-ethylbenzoxazolium, N-naphthylbenzoxazolium, N-phenylbenzoxazolium, N-(o-fluorophenyl)benzoxazolium, N-(p-chlorophenyl)benzoxazolium, N-(p-cyanophenyl)benzoxazolium, N-(o-methoxycarbonylphenyl)benzoxazolium, N-(2-furyl)benzoxazolium, N-(o-fluorophenyl)benzoxazolium, N-(p- cyanophenyl)benzoxazolium, N-(m-nitrophenyl)benzoxazolium, N-(p-isopropoxycarbonylphenyl)benzoxazolium, N-(2-thienyl)benzoxazolium, N-(m-carboxyphenyl)benzoxazolium, 2-mercapto-3-phenylbenzoxazolium, 2-methyl-3-phenylbenzoxazolium, 2-methylthio-3-(4-phenylsulfanylphenyl)benzoxazolium, 6-hydroxy-3-(p-tolyl)benzoxazolium, 7-mercapto-3-phenylbenzoxazolium, and 4,5-difluoro-3-ethylbenzoxazolium.

Examples of the onium cation (benzothiazolium cation) corresponding to general formula (10) include, but are not limited to, N-methylbenzothiazolium, N-ethylbenzothiazolium, N-phenylbenzothiazolium, N-(1-naphthyl)benzothiazolium, N-(p-fluorophenyl)benzothiazolium, N-(p-chlorophenyl)benzothiazolium, N-(p-cyanophenyl)benzothiazolium, N-(o-methoxycarbonylphenyl)benzothiazolium, N-(p-tolyl)benzothiazolium, N-(o-fluorophenyl)benzothiazolium, N-(m-nitrophenyl)benzothiazolium, N-(p-isopropoxycarbonylphenyl)benzothiazolium, N-(2-furyl)benzothiazolium, N-(4-methylthiophenyl)benzothiazolium, N-(4-phenylsulfanylphenyl)benzothiazolium, N-(2-naphthyl)benzothiazolium, N-(m-carboxyphenyl)benzothiazolium, 2-mercapto-3-phenylbenzothiazolium, 2-methyl-3-phenylbenzothiazolium, 2-methylthio-3-phenylbenzothiazolium, 6-hydroxy-3-phenylbenzothiazolium, 7-mercapto-3-phenylbenzothiazolium, and 4,5-difluoro-3-phenylbenzothiazolium.

Examples of the onium cation (furyl- or thienyl-iodonium cation) corresponding to general formula (11) include, but are not limited to, difuryliodonium, dithienyliodonium, bis(4,5-dimethyl-2-furyl)iodonium, bis(5-chloro-2-thienyl)iodonium, bis(5-cyano-2-furyl)iodonium, bis(5-nitro-2-thienyl)iodonium, bis(5-acetyl-2-furyl)iodonium, bis(5-carboxy-2-thienyl)iodonium, bis(5-methoxycarbonyl-2-furyl)iodonium, bis(5-phenyl-2-furyl)iodonium, bis(5-(p-methoxyphenyl)-2-thienyl)iodonium, bis(5-vinyl-2-furyl)iodonium, bis(5-ethynyl-2-thienyl)iodonium, bis(5-cyclohexyl-2-furyl)iodonium, bis(5-hydroxy-2-thienyl)iodonium, bis(5-phenoxy-2-furyl)iodonium, bis(5-mercapto-2-thienyl)iodonium, bis(5-butylthio-2-thienyl)iodonium, and bis(5-phenylthio-2-thienyl)iodonium.

Examples of the onium cation (diaryliodonium cation) corresponding to general formula (12) include, but are not limited to, diphenyliodonium, bis(p-tolyl)iodonium, bis(p-octylphenyl)iodonium, bis(p-octadecylphenyl)iodonium, bis(p-octyloxyphenyl)iodonium, bis(p-octadecyloxyphenyl)iodonium, phenyl(p-octadecyloxyphenyl)iodonium, 4-isopropyl-4'-methyldiphenyliodonium, (4-isobutylphenyl)-p-tolyliodonium, bis(1-naphthyl)iodonium, bis(4-phenylsulfanylphenyl)iodonium, phenyl(6-benzoyl-9-ethyl-9H-carbazol-3-yl)iodonium, (7-methoxy-2-oxo-2H-chromen-3-yl)-4'-isopropylphenyliodonium.

Next, the counter anion $X^-$ in general formula (3) will be described.

Although not restricted in principle, the counter anion $X^-$ in general formula (3) is preferably a non-nucleophilic anion. When the counter anion $X^-$ is a non-nucleophilic anion, nucleophilic reaction is less likely to occur with the coexisting cation in the molecule or with various materials used in combination with the anion, so that the photo-acid generator of general formula (2) itself and the composition containing it can have improved stability over time. As used herein, the term "non-nucleophilic anion" refers to an anion less capable of undergoing nucleophilic reaction. Examples of such an anion include $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

In particular, among the anions listed above, the counter anion $X^-$ in general formula (3) is preferably $PF_6^-$, $SbF_6^-$, or $AsF_6^-$, more preferably $PF_6^-$ or $SbF_6^-$.

In the present invention, therefore, preferred examples of the onium salt that forms the photo-acid generator (F) include onium salts composed of any of examples of the onium cation structures of general formulae (3) to (12) shown above and any anion selected from $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

More specifically, in the present invention, preferred examples of the photo-acid generator (F) include CYRACURE UVI-6992 and CYRACURE UVI-6974 (all manufactured by The Dow Chemical Company), ADEKA OPTOMER SP150, ADEKA OPTOMER SP152, ADEKA OPTOMER SP170, and ADEKA OPTOMER SP172 (all manufactured by ADEKA CORPORATION), IRGACURE 250 (manufactured by Ciba Specialty Chemicals Inc.), CI-5102 and CI-2855 (all manufactured by Nippon Soda Co., Ltd.), SAN-AID SI-60L, SAN-AID SI-80L, SAN-AID SI-100L, SAN-AID SI-110L, and SAN-AID SI-180L (all manufactured by SANSHIN CHEMICAL INDUSTRY CO., LTD.), CPI-100P and CPI-100A (all manufactured by SAN-APRO LTD.), and WPI-069, WPI-113, WPI-116, WPI-041, WPI-044, WPI-054, WPI-055, WPAG-281, WPAG-567, and WPAG-596 (all manufactured by Wako Pure Chemical Industries, Ltd.).

The content of the photo-acid generator (F) is preferably from 0.01 to 10 parts by weight, more preferably from 0.05 to 5 parts by weight, even more preferably from 0.1 to 3 parts by weight, based on the total weight of the active energy ray-curable resin composition.

(Epoxy Group-Containing Compound and Polymer) (G)

A compound having one or more epoxy groups per molecule or a polymer (epoxy resin) having two or more epoxy groups per molecule may be used. In this case, a compound having two or more functional groups per molecule reactive with an epoxy group may be used in combination with the epoxy group-containing compound or polymer. The functional group reactive with an epoxy group is typically carboxyl, phenolic hydroxyl, mercapto, or primary or secondary aromatic amino. In particular, the compound preferably has two or more functional groups of any of these types per molecule in view of three-dimensionally curing properties.

Examples of polymers having one or more epoxy groups per molecule include epoxy resins such as bisphenol A epoxy resins derived from bisphenol A and epichlorohydrin, bisphenol F epoxy resins derived from bisphenol F and epichlorohydrin, bisphenol S epoxy resins, phenol novolac epoxy resins, cresol novolac epoxy resins, bisphenol A novolac epoxy resins, bisphenol F novolac epoxy resins, alicyclic epoxy resins, diphenyl ether epoxy resins, hydroquinone epoxy resins, naphthalene epoxy resins, biphenyl epoxy resins, fluorene epoxy resins, polyfunctional epoxy resins such as trifunctional epoxy resins and tetrafunctional epoxy resins, glycidyl ester epoxy resins, glycidyl amine epoxy resins, hydantoin epoxy resins, isocyanurate epoxy resins, and aliphatic chain epoxy resins. These epoxy resins may be halogenated or hydrogenated. Examples of commercially available epoxy resin products include, but are not limited to, EPIKOTE 828, EPIKOTE 1001, EPIKOTE 801N, EPIKOTE 806, EPIKOTE 807, EPIKOTE 152, EPIKOTE 604, EPIKOTE 630, EPIKOTE 871, EPIKOTE YX8000, EPIKOTE YX8034, and EPIKOTE YX4000 manufactured by Japan Epoxy Resins Co., Ltd., EPICLON 830, EPICLON EXA-835LV, EPICLON HP-4032D, and EPICLON HP-820 manufactured by DIC Corporation, EP4100 series, EP4000 series, and EPU series manufactured by ADEKA CORPORATION, CELLOXIDE series (e.g., 2021, 2021P, 2083, 2085, and 3000), EPOLEAD series, and EHPE series manufactured by DAICEL CORPORATION, YD series, YDF series, YDCN series, YDB series, and phenoxy resins (polyhydroxypolyethers synthesized from bisphenols and epichlorohydrin and terminated at both ends with epoxy groups, e.g, YP series) manufactured by NIPPON STEEL & SUMIKIN CHEMICAL CO., LTD., DENACOL series manufactured by Nagase ChemteX Corporation, and Epolite series manufactured by Kyoeisha Chemical Co., Ltd. These epoxy resins may be used in combination of two or more. It should be noted that the epoxy group-containing compound and polymer (G) are not taken into account in the calculation of the glass transition temperature Tg of the adhesive layer.

(Alkoxyl Group-Containing Compound and Polymer) (G)

The compound having an alkoxyl group in the molecule may be any known compound having one or more alkoxyl group per molecule. Such a compound is typically a silane coupling agent. It should be noted that the alkoxyl group-containing compound and polymer (H) are not taken into account in the calculation of the glass transition temperature Tg of the adhesive layer.

Examples of an amino group-containing silane coupling agent (H) include amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; and ketimine silanes such as N-(1,3-dimethylbutylidene)-3-(triethoxysilyl)-1-propaneamine.

These amino group-containing silane coupling agents (H) may be used singly or in combination of two or more. Among them, γ-aminopropyltrimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, and N-(1,3-dimethylbutylidene)-3-(triethoxysilyl)-1-propaneamine are preferred in order to ensure good tackiness.

The content of the amino group-containing silane coupling agent (H) is preferably in the range of 0.01 to 20% by weight, more preferably 0.05 to 15 parts by weight, even more preferably 0.1 to 10 parts by weight, based on 100% by weight of the total amount of the composition. If the content is more than 20 parts by weight, the adhesive may have poor storage stability, and if the content is less than 0.1 parts by weight, the effect of water-resistant tackiness may fail to be sufficiently produced. It should be noted that the amino group-containing silane coupling agent (H) is not taken into account in the calculation of the glass transition temperature Tg of the adhesive layer.

When the active energy ray-curable adhesive composition used in the present invention is of an electron beam-curable type, it is not particularly necessary to add a photopolymerization initiator to the composition. However, when the adhesive composition used is of an ultraviolet-curable type, a photopolymerization initiator is preferably used in the adhesive composition, and in particular, a photopolymerization initiator having high sensitivity to light of 380 nm or longer is preferably used in the adhesive composition. The photopolymerization initiator having high sensitivity to light of 380 nm or longer will be described below.

When the active energy ray-curable adhesive composition for use in the present invention is formed, a compound represented by general formula (1):

[Formula 14]

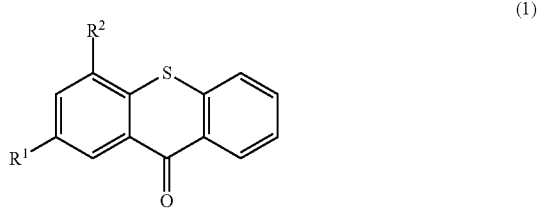

(1)

wherein $R^1$ and $R^2$ each represent —H, —CH$_2$CH$_3$, -i-Pr, or Cl, and $R^1$ and $R^2$ may be the same or different, is preferably used alone as a photopolymerization initiator, or the compound represented by general formula (1) is preferably used as a photopolymerization initiator in combination with another photopolymerization initiator having high sensitivity to light of 380 nm or longer described below. The resulting tackiness is higher when the compound of general formula (1) is used than when a photopolymerization initiator having high sensitivity to light of 380 nm or longer is used alone. In particular, the compound of general formula (1) is preferably diethyl thioxanthone in which $R^1$ and $R^2$ are each —CH$_2$CH$_3$. Based on 100% by weight of the total amount of the composition, the content of the compound of general formula (1) in the composition is preferably from 0.1 to 5.0% by weight, more preferably from 0.5 to 4.0% by weight, even more preferably from 0.9 to 3.0% by weight.

The photopolymerization initiator of general formula (1) can initiate polymerization with long-wavelength light capable of passing through transparent protective films having the ability to absorb UV. Therefore, the adhesive composition can be cured with light through UV-absorbing films. Specifically, for example, even when the low-water-vapor-permeability transparent protective films placed on both sides of the polarizer have the ability to absorb UV, the adhesive composition containing the photopolymerization initiator of general formula (1) can be cured with light.

If necessary, a polymerization initiation aid is preferably added to the composition. In particular, the polymerization initiation aid is preferably triethylamine, diethylamine, N-methyldiethanolamine, ethanolamine, 4-dimethylaminobenzoic acid, methyl 4-dimethylaminobenzoate, ethyl 4-dimethylaminobenzoate, or isoamyl 4-dimethylaminobenzoate. Ethyl 4-dimethylaminobenzoate is particularly preferred. When the polymerization initiation aid is used, the content of the aid is generally 0 to 5% by weight, preferably 0 to 4% by weight, most preferably 0 to 3% by weight, based on 100% by weight of the total amount of the composition.

If necessary, a known photopolymerization initiator may be used in combination. Since the transparent protective film having the ability to absorb UV does not transmit light of 380 nm or shorter, such a photopolymerization initiator should preferably have high sensitivity to light of 380 nm or longer. Examples of such an initiator include 2-methyl-1-(4-methylthiophenyl)-2-morpholinopropan-1-on, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, and bis(η5-2,4-cyclopentadien-1-yl)-bis(2,6-difluoro-3-(1H-pyrrol-1-yl)-phenyl)titanium.

In particular, a compound represented by general formula (2):

[Formula 15]

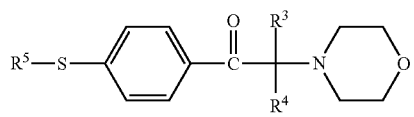

(2)

wherein $R^3$, $R^4$, and $R^5$ each represent —H, —$CH_3$, —$CH_2CH_3$, -i-Pr, or Cl, and $R^3$, $R^4$, and $R^5$ may be the same or different, is preferably used in addition to the photopolymerization initiator of general formula (1). Commercially available 2-methyl-1-(4-methylthiophenyl)-2-morpholino-propan-1-on (IRGACURE 907 (trade name) manufactured by BASF) is advantageously used as the compound of general formula (2). Besides this, 2-benzyl-2-dimethyl-amino-1-(4-morpholinophenyl)-butanone-1 (IRGACURE 369 (trade name) manufactured by BASF) and 2-(dimethylamino)-2-[(4-methylphenyl)methyl]-1-[4-(4-morpholinyl)phenyl]-1-butanone (IRGACURE 379 (trade name) manufactured by BASF) are preferred because of their high sensitivity.

The active energy ray-curable adhesive composition used in the present invention may also contain any of various additives as other optional components as long as the objects and effects of the present invention are not impaired. Examples of such additives include polymers or oligomers such as epoxy resin, polyamide, polyamide imide, polyurethane, polybutadiene, polychloroprene, polyether, polyester, styrene-butadiene block copolymers, petroleum resin, xylene resin, ketone resin, cellulose resin, fluorooligomers, silicone oligomers, and polysulfide oligomers, polymerization inhibitors such as phenothiazine and 2,6-di-tert-butyl-4-methylphenol, polymerization initiation aids, leveling agents, wettability modifiers, surfactants, plasticizers, ultraviolet absorbers, silane coupling agents, inorganic fillers, pigments, and dyes.

Among these additives, silane coupling agents can impart higher water resistance by acting on the surface of the polarizer. When a silane coupling agent is used, the content of the silane coupling agent is generally 0 to 10% by weight, preferably 0 to 5% by weight, most preferably 0 to 3% by weight, based on 100% by weight of the total amount of the composition.

The silane coupling agent to be used is preferably an active energy ray-curable compound. However, even when it is not active energy ray-curable, it can also impart a similar level of water resistance.

Examples of silane coupling agents as active energy ray-curable compounds include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Examples of non-active-energy-ray-curable silane coupling agents include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

Preferred are 3-methacryloxypropyltrimethoxysilane and 3-acryloxypropyltrimethoxysilane.

In the present invention, the active energy ray-curable adhesive composition may be used in the form of an electron beam-curable adhesive or an ultraviolet-curable adhesive.

When the active energy ray-curable adhesive composition is electron beam-curable, any suitable conditions under which the adhesive composition can be cured may be used in the process of applying electron beams to the adhesive composition. For example, electron beams are preferably applied at an acceleration voltage of 5 kV to 300 kV, more preferably 10 kV to 250 kV. If the acceleration voltage is lower than 5 kV, electron beams may fail to reach the adhesive composition, so that insufficient curing may occur. If the acceleration voltage is higher than 300 kV, electron beams can have too high intensity penetrating through the material and thus may damage the transparent protective film or the polarizer. The exposure dose is preferably from 5 to 100 kGy, more preferably from 10 to 75 kGy. At an exposure dose of less than 5 kGy, the adhesive composition may be insufficiently cured. An exposure dose of more than 100 kGy may damage the transparent protective film or the polarizer and cause yellow discoloration or a reduction in mechanical strength, which may make it impossible to obtain the desired optical properties.

Electron beam irradiation is generally performed in an inert gas. If necessary, however, electron beam irradiation may be performed in the air or under conditions where a small amount of oxygen is introduced. When oxygen is appropriately introduced, oxygen-induced inhibition can be intentionally produced on the surface of the transparent protective film, to which electron beams are first applied, so that the transparent protective film can be prevented from being damaged and electron beams can be efficiently applied only to the adhesive composition, although it depends on the material of the transparent protective film.

On the other hand, when the active energy ray-curable adhesive composition is ultraviolet-curable and when the transparent protective film used has the ability to absorb ultraviolet rays, the transparent protective film can absorb light with wavelengths shorter than about 380 nm, and therefore, light with wavelengths shorter than 380 nm cannot reach the active energy ray-curable adhesive composition and thus cannot contribute to the polymerization reaction of the composition. When absorbed by the transparent protective film with a low water-vapor permeability, the light with wavelengths shorter than 380 nm is also converted into heat, so that the transparent protective film itself can generate heat, which can cause a defect such as curling or wrinkling of the polarizing film. Therefore, when the ultraviolet-curable adhesive composition is used in the present invention, the active energy ray generator used preferably does not emit light with wavelengths shorter than 380 nm. More specifically, the ratio of the total illuminance in the wavelength range of 380 to 440 nm to the total illuminance in the wavelength range of 250 to 370 nm is preferably from 100:0 to 100:50, more preferably from 100:0 to 100:40. The source of ultraviolet rays satisfying such a relation for the total illuminance is preferably a gallium-containing metal halide lamp or an LED light source emitting light with wavelengths ranging from 380 to 440 nm. Alternatively, a low-pressure mercury lamp, a middle-pressure mercury lamp, a high-pressure mercury lamp, an ultrahigh-pressure mercury lamp, an incandescent lamp, a xenon lamp, a halogen lamp, a carbon arc lamp, a metal halide lamp, a fluorescent lamp, a tungsten lamp, a gallium lamp, an excimer laser, or sunlight may be used as the light source in combination with a band pass filter to block light with wavelengths shorter than 380 nm.

When the active energy ray-curable adhesive composition is ultraviolet-curable, the adhesive composition is preferably heated before irradiated with ultraviolet rays (heating before irradiation). In this case, the composition is preferably heated to 40° C. or higher, more preferably 50° C. or higher. The active energy ray-curable adhesive composition is also preferably heated after irradiated with ultraviolet rays (heating after irradiation). In this case, the composition is preferably heated to 40° C. or higher, more preferably 50° C. or higher.

The active energy ray-curable adhesive composition according to the present invention is particularly suitable for use in forming an adhesive layer to bond the polarizer and the transparent protective film with a 365 nm wavelength light transmittance of less than 5%. In the present invention, the active energy ray-curable adhesive composition containing the photopolymerization initiator of general formula (1) can form a cured adhesive layer by being irradiated with ultraviolet rays through the transparent protective film having the ability to absorb UV. In this case, the adhesive layer can be cured even in the polarizing film where the transparent protective films having the ability to absorb UV are placed on both sides of the polarizer. It will be understood, however, that the adhesive layer can be cured also in the polarizing film of a laminate containing low water-vapor permeability transparent protective films with no ability to absorb UV. As used herein, the term "transparent protective film having the ability to absorb UV" means a transparent protective film with a 380 nm light transmittance of less than 10%.

Methods for imparting the ability to absorb UV to the transparent protective film include a method of adding an ultraviolet absorber into the transparent protective film and a method of placing, on the surface of the transparent protective film, a surface treatment layer containing an ultraviolet absorber.

Examples of the ultraviolet absorber include conventionally known oxybenzophenone compounds, benzotriazole compounds, salicylate ester compounds, benzophenone compounds, cyanoacrylate compounds, nickel complex salt compounds, and triazine compounds.

<Polarizing Film>

The polarizing film according to the present invention can be manufactured, for example, by a method of manufacturing a polarizing film including a polarizer and a transparent protective film provided on at least one surface of the polarizer with an adhesive layer interposed therebetween, wherein, specifically, the transparent protective film has a water-vapor permeability of 150 g/m²/24 hours or less and a 365 nm wavelength light transmittance of less than 5%, the method including: an application step including applying an active energy ray-curable adhesive composition to at least one surface of the polarizer or the transparent protective film, wherein the adhesive composition contains a radically polymerizable compound; a lamination step including laminating the polarizer and the transparent protective film; and a bonding step including curing the active energy ray-curable adhesive composition by applying active energy rays to the composition from the polarizer side or the transparent protective film side to form an adhesive layer, so that the polarizer and the transparent protective film are bonded with the adhesive layer interposed therebetween.

The polarizer or the transparent protective film may be subjected to a surface modification treatment before the active energy ray-curable adhesive composition is applied thereto. Specifically, such a treatment may be a corona treatment, a plasma treatment, a flame treatment, or an excimer treatment.

The method for applying the active energy ray-curable adhesive composition is appropriately selected depending on the viscosity of the composition or the desired thickness. Examples of application means include a reverse coater, a gravure coater (direct, reverse, or offset), a bar reverse coater, a roll coater, a die coater, a bar coater, a rod coater, etc. Any other suitable application method such as dipping may also be used.

The active energy ray-curable adhesive composition is preferably applied so as to form an adhesive layer with a thickness of 0.01 to 7 μm. The thickness of the adhesive layer is more preferably from 0.01 to 5 μm, even more preferably from 0.01 to 2 μm, most preferably from 0.01 to 1 μm. The thickness of the adhesive layer is preferably 0.01 μm or more so that cohesive strength can be achieved for the adhesive power to produce a certain level of adhesive strength. On the other hand, the thickness of the adhesive layer is preferably 7 μm or less in view of the durability of the polarizing film.

The polarizer and the transparent protective film are laminated with the adhesive interposed therebetween, which has been applied as described above. The lamination of the polarizer and the transparent protective film may be performed using a roll laminator or other laminators.

After the polarizer and the transparent protective film are laminated, the active energy ray-curable adhesive composition is cured by the application of active energy rays (such as electron beams or ultraviolet rays) to form an adhesive layer. Active energy rays (such as electron beams or ultraviolet rays) may be applied in any suitable direction. Active energy rays are preferably applied to the composition from the transparent protective film side. The application of active energy rays (such as electron beams or ultraviolet rays) to the composition from the polarizer side may lead to degradation of the polarizer.

When the polarizing film is manufactured according to the present invention using a continuous line, the line speed is preferably from 1 to 500 m/minute, more preferably from 5 to 300 m/minute, even more preferably from 10 to 100 m/minute, depending on the time required to cure the adhesive. If the line speed is too low, the productivity can be low, or damage to the transparent protective film can be too much, which can make it impossible to produce a polarizing film capable of withstanding durability tests and so on. If the line speed is too high, the adhesive composition can be insufficiently cured, so that the desired tackiness may fail to be obtained.

The polarizing film of the present invention, which has the polarizer and the transparent protective film bonded together with the adhesive layer interposed therebetween and made of a curing product layer of the active energy ray-curable adhesive composition, may further include an adhesion-facilitating layer between the transparent protective film and the adhesive layer. For example, the adhesion-facilitating layer may be made of any of various resins having a polyester skeleton, a polyether skeleton, a polycarbonate skeleton, a polyurethane skeleton, a silicone moiety, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

Usually, the adhesion-facilitating layer is provided in advance on the transparent protective film, and then the adhesion-facilitating layer side of the transparent protective film is bonded to the polarizer with the adhesive layer. The adhesion-facilitating layer can be formed using a known technique that includes applying an adhesion-facilitating layer-forming material onto the transparent protective film and drying the material. The adhesion-facilitating layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 μm, more preferably 0.02 to 2 μm, even more preferably 0.05 to 1 μm. Two or more adhesion-facilitating layers may be provided. Also in this case, the total thickness of the adhesion-facilitating layers preferably falls within such ranges.

For practical use, the polarizing film of the present invention may be laminated with any other optical layer or layers to form an optical film. As a non-limiting example, such an optical layer or layers may be one or more reflectors, transflectors, retardation plates (including wavelength plates such as half or quarter wavelength plates), viewing angle compensation films, or other optical layers, which have ever been used in liquid crystal display devices or other devices. Particularly preferred is a reflective or transflective polarizing film including a laminate of the polarizing film of the present invention and a reflector or a transflector, an elliptically or circularly polarizing film including a laminate of the polarizing film of the present invention and a retardation plate, a wide viewing angle polarizing film including a laminate of the polarizing film of the present invention and a viewing angle compensation film, or a polarizing film including a laminate of the polarizing film of the present invention and a brightness enhancement film.

The optical film including a laminate of the polarizing film and the optical layer may be formed by a method of stacking them one by one in the process of manufacturing a liquid crystal display device or the like. However, an optical film formed in advance by lamination is advantageous in that it can facilitate the process of manufacturing a liquid crystal display device or the like, because it has stable quality and good assembling workability. In the lamination, any appropriate bonding means such as a pressure-sensitive adhesive layer may be used. When the polarizing film and any other optical film are bonded together, their optical axes may be each aligned at an appropriate angle, depending on the desired retardation properties or other desired properties.

A pressure-sensitive adhesive layer for bonding to any other member such as a liquid crystal cell may also be provided on the polarizing film or the optical film including a laminate having at least one layer of the polarizing film. As a non-limiting example, the pressure-sensitive adhesive for use in forming the pressure-sensitive adhesive layer may be appropriately selected from pressure-sensitive adhesives containing, as a base polymer, an acryl-based polymer, a silicone-based polymer, polyester, polyurethane, polyamide, polyether, a fluoropolymer, or a rubber polymer. In particular, a pressure-sensitive adhesive having a high level of optical transparency, weather resistance, and heat resistance and exhibiting an appropriate degree of wettability, cohesiveness, and tackiness is preferably used, such as an acrylic pressure-sensitive adhesive.

The pressure-sensitive adhesive layer may also be formed as a laminate of layers different in composition, type or other features on one or both sides of the polarizing film or the optical film. When pressure-sensitive adhesive layers are provided on both front and back sides of the polarizing film or the optical film, they may be different in composition, type, thickness, or other features. The thickness of the pressure-sensitive adhesive layer may be determined depending on the intended use, adhering strength, or other factors, and is generally from 1 to 500 μm, preferably from 1 to 200 μm, more preferably from 1 to 100 μm.

The exposed surface of the pressure-sensitive adhesive layer may be temporarily covered with a separator for anti-pollution or other purposes until it is actually used. This can prevent contact with the pressure-sensitive adhesive layer during usual handling. According to conventional techniques, except for the above thickness conditions, a suitable separator may be used, such as a plastic film, a rubber sheet, a paper sheet, a cloth, a nonwoven fabric, a net, a foam sheet, a metal foil, any laminate thereof, or any other suitable thin material, which is optionally coated with any suitable release agent such as a silicone, long-chain alkyl, or fluoride release agent, or molybdenum sulfide.

The polarizing film or optical film of the present invention is preferably used to form liquid crystal display devices or other various devices. Liquid crystal display devices may be formed according to conventional techniques. Specifically, a liquid crystal display device may be typically formed by appropriately assembling a liquid crystal cell, polarizing films or optical films, and an optional component such as a lighting system, and incorporating a driving circuit according to any conventional techniques, except that the polarizing films or optical films used are according to the present invention. The liquid crystal cell to be used may also be of any type such as TN type, STN type, or π type.

Any desired liquid crystal display device may be formed, such as a liquid crystal display device including a liquid crystal cell and the polarizing or optical film or films placed on one or both sides of the liquid crystal cell or a liquid crystal display device further including a backlight or a reflector in a lighting system. In such a case, the polarizing or optical film or films according to the present invention may be placed on one or both sides of the liquid crystal cell. When the polarizing or optical films are provided on both sides, they may be the same or different. The process of forming a liquid crystal display device may also include placing a suitable component such as a diffusion plate, an antiglare layer, an anti-reflection film, a protective plate, a prism array, a lens array sheet, a light diffusion plate, or a backlight in one or more layers at a suitable position or positions.

EXAMPLES

Hereinafter, the present invention will be described with reference to examples, which, however, are not intended to limit the present invention.

<Preparation of Polarizer>

A 75-μm-thick polyvinyl alcohol film with an average degree of polymerization of 2,400 and a degree of saponification of 99.9% by mole was immersed in warm water at 30° C. for 60 seconds so that it was allowed to swell. The film was then immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer (32.8 in SP value and 23 μm in thickness). The polarizer had a water content of 14% by weight.

<Transparent Protective Films>

Acrylic resin film (22.2 in SP value) with a thickness of 40 μm and a water-vapor permeability of 60 g/m$^2$/24 hours Cyclic olefin polymer resin film (18.6 in SP value) with a thickness of 50 μm and a water-vapor permeability of 5 g/m$^2$/24 hours (ZeonorFilm ZB12-52125 manufactured by ZEON CORPORATION)

Triacetylcellulose (TAC) film (23.3 in SP value) with a thickness of 60 μm and a water-vapor permeability of 500 g/m$^2$/24 hours <<Water-Vapor Permeability of Transparent Protective Film>>

The water-vapor permeability was measured using the water-vapor permeability test (cup method) according to JIS Z 0208. A cut piece sample with a diameter of 60 mm was placed in a moisture-permeable cup to which about 15 g of calcium chloride had been added. The cup was then placed and stored in a thermostatic chamber at a temperature of 40° C. and a humidity of 90% R.H. The weight of the calcium chloride was measured before and after the storage for 24 hours, and the increase in the weight of the calcium chloride was determined and used to calculate the water-vapor permeability (g/m$^2$/24 hours).

<Active Energy Rays>

The active energy rays used were as follows: ultraviolet rays (gallium-containing metal halide lamp); irradiator, Light Hammer 10 manufactured by Fusion UV Systems, Inc.; valve, V valve; peak illuminance, 1,600 mW/cm$^2$; total dose, 1,000 mJ/cm$^2$ (wavelength 380-440 nm). The illuminance of ultraviolet rays was measured using Sola-Check System manufactured by Solatell Ltd.

<Preparation of Active Energy Ray-Curable Adhesive Composition (1)>

An active energy ray-curable adhesive composition (1) was obtained by mixing 38.3 parts of N-hydroxyethylacrylamide (29.6 in SP value, capable of forming a homopolymer with a Tg of 123° C., manufactured by KOHJIN Film & Chemicals Co., Ltd.) as the radically polymerizable compound (A), 19.1 parts of tripropylene glycol diacrylate (Aronix M-220 (trade name) manufactured by Toagosei Co., Ltd., 19.0 in SP value, capable of forming a homopolymer with a Tg of 69° C.) as the radically polymerizable compound (B), 38.3 parts of acryloylmorpholine (22.9 in SP value, capable of forming a homopolymer with a Tg of 150° C., manufactured by KOHJIN Film & Chemicals Co., Ltd.) as the radically polymerizable compound (C), and 1.4 parts of a photopolymerization initiator (KAYACURE DETX-S (trade name) manufactured by Nippon Kayaku Co., Ltd., diethylthioxanthone), and stirring them at 50° C. for 1 hour.

<Preparation of Active Energy Ray-Curable Adhesive Composition (2)>

An active energy ray-curable adhesive composition (2) was obtained by adding 10 parts of acetoacetoxyethyl methacrylate (AAEM) (manufactured by The Nippon Synthetic Chemical Industry Co., Ltd.) to the active energy ray-curable adhesive composition (1).

<Preparation of Active Energy Ray-Curable Adhesive Composition (3)>

An active energy ray-curable adhesive composition (3) was obtained by adding 10 parts of DENACOL EX-611 (sorbitol polyglycidyl ether, manufactured by Nagase ChemteX Corporation) and 3 parts of CPI-100P (a propylene carbonate solution containing 50% of active components including triarylsulfonium hexafluorophosphate as a main component, manufactured by SAN-APRO LTD.) as a photo-acid generator to the active energy ray-curable adhesive composition (1).

<Preparation of Active Energy Ray-Curable Adhesive Composition (4)>

An active energy ray-curable adhesive composition (4) was obtained by adding 10 parts of KBM-403 (3-glycidoxy-propylmethyldiethoxysilane, manufactured by Shin-Etsu Chemical Co., Ltd.) and 3 parts of CPI-100P (a propylene carbonate solution containing 50% of active components including triarylsulfonium hexafluorophosphate as a main component, manufactured by SAN-APRO LTD.) to the active energy ray-curable adhesive composition (1).

<Preparation of Active Energy Ray-Curable Adhesive Composition (5)>

An active energy ray-curable adhesive composition (5) was obtained by adding 1 part of KBM-603 (N-2-(aminoethyl)-3-aminopropyltriethoxysilane, manufactured by Shin-Etsu Chemical Co., Ltd.) to the active energy ray-curable adhesive composition (1).

<<Glass Transition Temperature (Tg)>>

The Tg was measured with a dynamic viscoelastometer RSA-III manufactured by TA Instruments under the following conditions: Sample size, 10 mm wide, 30 mm long; clamp distance, 20 mm; measurement mode, tensile mode; frequency, 1 Hz; rate of temperature rise, 5° C./minute. The dynamic viscoelasticity was measured, and the tan δ peak temperature was used as the Tg.

Example 1

<Preparation of Polarizing Film>

A 0.5-μm-thick urethane-based adhesion-facilitating layer was formed on the acrylic resin film. Using an MCD coater (manufactured by FUJI KIKAI KOGYO Co., Ltd; cell shape, honeycomb; the number of gravure roll lines, 1000/inch; rotational speed, 140% relative to line speed), the active energy ray-curable adhesive composition was then applied to the adhesion-facilitating layer so that a 0.5-μm-thick adhesive layer could be formed. Using a roller machine, two pieces of the acrylic resin film were bonded as transparent protective films 1 and 2 to both sides of the polarizer with the adhesive composition interposed between the polarizer and the acrylic resin film. The resulting laminate was then heated to 50° C. from both the bonded acrylic resin film sides using an IR heater, and the ultraviolet rays were applied to both sides to cure the active energy ray-curable adhesive composition. The laminate was further hot air-dried at 70° C. for 3 minutes to give a polarizing film including the polarizer and the transparent protective films on both sides of the polarizer. The lamination was performed at a line speed of 25 m/minute. The adhesive layers had a Tg of 121° C.

Examples 2 and 3

Polarizing films were obtained as in Example 1, except that the transparent protective film type was changed as shown in Table 2. When the transparent protective film was a cyclic olefin polymer resin film, a corona treatment was performed instead of forming the adhesion-facilitating layer on the acrylic resin film.

Example 4

A polarizing film was obtained as in Example 1, except that before the application step, both sides of the polarizer were subjected to a dry treatment (corona treatment) at a corona discharge power of 80 W·min/m$^2$.

Examples 5 to 9

Polarizing films were obtained as in Example 1, except that different active energy ray-curable adhesive compositions (active energy ray-curable adhesive compositions (2) to (5)) were used instead, as shown in Table 2.

Comparative Example 1

<Preparation of Aqueous Adhesive>
One hundred parts of acetoacetyl group-containing, polyvinyl alcohol resin (1,200 in average degree of polymerization, 98.5% by mole in degree of saponification, 5% by mole in degree of acetoacetylation) and 50 parts of methylol melamine were dissolved in pure water at a temperature of 30° C. to form an aqueous solution with an adjusted solid concentration of 3.7%. An aqueous adhesive solution was prepared by adding 18 parts of an aqueous alumina colloidal solution (15 nm in average particle size, 10% in solid concentration, positive charge) to 100 parts of the aqueous solution.

<Preparation of Polarizing Film>
A 0.3-μm-thick urethane-based adhesion-facilitating layer was formed on the acrylic resin film. Using a roller machine, two pieces of the acrylic resin film (adhesion-facilitating layer side) were then bonded to both sides of the polarizer with the aqueous adhesive interposed between the polarizer and each acrylic resin film. The resulting laminate was then dried at 70° C. for 3 minutes to give a polarizing film. The aqueous adhesive was so dropped that a 150-nm-thick adhesive layer could be formed between the polarizer and the acrylic resin film.

Comparative Examples 2 and 3

Polarizing films were obtained as in Comparative Example 1, except that the transparent protective film type was changed as shown in Table 2. When the transparent protective film was a cyclic olefin polymer resin film, a corona treatment was performed instead of forming the adhesion-facilitating layer on the acrylic resin film.

[Evaluation]
The polarizing films obtained in the examples and the comparative examples were evaluated as described below. The results are shown in Table 2.

(Measurement of Degree of Polarization)
The single transmittance T, parallel transmittance Tp, and cross transmittance Tc of each polarizing film were measured using an ultraviolet-visible spectrophotometer (V7100 manufactured by JASCO Corporation). These transmittances were Y values obtained from measurements through luminosity correction using the two-degree field (illuminant C) according to JIS Z 8701. Using the transmittances, the degree P of polarization was calculated from the following formula.

Degree $P$ (%) of polarization=$\{(Tp-Tc)/(Tp+Tc)\}^{1/2} \times 100$

Table 2 shows the degree of polarization at a single transmittance of 42.8%.

(Evaluation of Durability)
Each polarizing film was cut into a rectangular sample piece with a length of 50 mm in the stretched direction of the polarizer and with a width of 25 mm in the direction perpendicular thereto. The sample piece was placed in a humidifying apparatus and stored in an environment at 20° C. and 98% R.H. for 48 hours. The hue values a1 and b1 of the sample piece were measured again with the spectrophotometer. Using the measurements obtained before and after the storage in the humidifying apparatus, the orthogonal hue change Δab was calculated from the formula below. The hue values are a and b values in the Hunter color system.

$\Delta ab = \{(a1-a0)^2 + (b1-b0)^2\}^{1/2}$ (Amount of Change in the Water Content of Polarizing Film)
Immediately after the polarizing film was prepared, a sample piece of the polarizing film was cut in the same shape, and the water content M1(%) of the sample piece was measured. On the other hand, after the polarizing film was prepared, the polarizing film was stored in an environment at 20° C. and 65% R.H. for 120 hours and then measured for water content M2(%). The amount (%) of change in the water content of the polarizing film was calculated from the following formula.

The amount (%) of change in the water content of the polarizing film=M2−M1

Each of the water contents M1 and M2 of the polarizing film was calculated from the following formulae.

$M1(\%) = \{(W1-W0)/W1\} \times 100$ $M2(\%) = \{(W2-W0)/W2\} \times 100$

W0: the weight of the polarizing film after it was dried at 120° C. for 2 hours
W1: the weight of the polarizing film immediately after it was prepared
W2: the weight of the polarizing film after it was stored in an environment at 20° C. and 65% R.H for 120 hours.

<Adhesive Strength after Immersion in Warm Water (Evaluation of Water Resistance)>
The polarizing film was cut into a piece with a length of 200 mm in a direction parallel to the stretched direction of the polarizer and with a width of 15 mm in a direction perpendicular thereto. Using a cutter knife, an incision was made between the transparent protective film (acrylic resin film) and the polarizer, and then the polarizing film was bonded to a glass plate. The polarizing film was then immersed in warm water at 40° C. for 2 hours. Within 30 minutes after the polarizing film was taken out of the warm water, the protective film was peeled off from the polarizer at an angle of 90° and a peeling rate of 300 mm/minute (in an undried state) when the peel strength (N/15 mm) was measured using a Tensilon tester. The case where the peel strength was 0.5 N/15 mm or more is expressed by the symbol "◯," the case where it was from 0.3 N/15 mm to less than 0.5 N/15 mm by the symbol "Δ," and the case where it was less than 0.3 N/15 mm by the symbol "x."

TABLE 2

| | Transparent protective film 1 | | Transparent protective film 2 | | | | Evaluations | | | |
|---|---|---|---|---|---|---|---|---|---|---|
| | Film material | Water-vapor permeability (g/m²/ 24 h) | Film material | Water-vapor permeability (g/m²/ 24 h) | Dry treatment Corona treatment | Adhesive: same in both sides Type | Degree of polarization | Durability Δab | Amount (%) of change in water content of polarizing plate | Water resistance |
| Example 1 | Acrylic resin | 60 | Acrylic resin | 60 | Absent | Active energy ray-curable adhesive composition (1) | 99.997 | 0.6 | 0.2 | Δ |
| Example 2 | Cyclic olefin polymer resin | 5 | Cyclic olefin polymer resin | 5 | Absent | Active energy ray-curable adhesive composition (1) | 99.997 | 0.7 | 0 | Δ |
| Example 3 | Acrylic resin | 60 | Cyclic olefin polymer resin | 5 | Absent | Active energy ray-curable adhesive composition (1) | 99.997 | 0.6 | 0.1 | Δ |
| Example 4 | Acrylic resin | 60 | Cyclic olefin polymer resin | 5 | Present | Active energy ray-curable adhesive composition (1) | 99.997 | 0.6 | 0.1 | ◯ |
| Example 5 | Acrylic resin | 60 | Cyclic olefin polymer resin | 5 | Absent | Active energy ray-curable adhesive composition (2) | 99.997 | 0.6 | 0.1 | ◯ |
| Example 6 | Acrylic resin | 60 | Cyclic olefin polymer resin | 5 | Absent | Active energy ray-curable adhesive composition (3) | 99.997 | 0.8 | 0.1 | ◯ |
| Example 7 | Acrylic resin | 60 | Cyclic olefin polymer resin | 5 | Absent | Active energy ray-curable adhesive composition (4) | 99.997 | 0.8 | 0.1 | ◯ |
| Example 8 | Acrylic resin | 60 | Cyclic olefin polymer resin | 5 | Absent | Active energy ray-curable adhesive composition (5) | 99.997 | 0.9 | 0.1 | ◯ |
| Comparative Example 1 | Acrylic resin | 60 | Acrylic resin | 60 | Absent | Aqueous adhesive | 99.95 | 2.2 | 0.2 | ◯ |
| Comparative Example 2 | Cyclic olefin polymer resin | 5 | Cyclic olefin polymer resin | 5 | Absent | Aqueous adhesive | 99.95 | 3.1 | 0 | ◯ |
| Comparative Example 3 | TAC | 600 | TAC | 600 | Absent | Aqueous adhesive | 99.997 | 0.4 | 1.2 | ◯ |

The invention claimed is:

1. A polarizing film, comprising:
a polarizer;
transparent protective films with a water-vapor permeability of 150 g/m²/24 hours or less provided on both sides of the polarizer; and
adhesive layers each interposed between the polarizer and one of the transparent protective films, wherein
the adhesive layers are formed by applying an active energy ray to an active energy ray-curable adhesive composition,
the active energy ray-curable adhesive composition contains
20 to 60% by weight of (A) a radically polymerizable compound with an SP value of 29.0 $(MJ/m^3)^{1/2}$ to 32.0 $(MJ/m^3)^{1/2}$,
10 to 30% by weight of (B) a radically polymerizable compound with an SP value of 18.0 $(MJ/m^3)^{1/2}$ to less than 21.0 $(MJ/m^3)^{1/2}$, and
20 to 60% by weight of (C) a radically polymerizable compound with an SP value of 21.0 $(MJ/m^3)^{1/2}$ to 23.0 $(MJ/m^3)^{1/2}$, based on 100% by weight of the total amount of the composition,
the radically polymerizable compounds (A), (B), and (C) are each capable of forming a homopolymer with a glass transition temperature (Tg) of 60° C. or more, and
the transparent protective films are bonded to the polarizer with the adhesive layers.

2. The polarizing film according to claim 1, wherein the adhesive layers have a glass transition temperature Tg of 60° C. or more.

3. The polarizing film according to claim 1, wherein the active energy ray-curable adhesive composition further contains (D) a radically polymerizable compound having an active methylene group and (E) a radical polymerization initiator having a hydrogen-withdrawing function.

4. The polarizing film according to claim 3, wherein the active methylene group is an acetoacetyl group.

5. The polarizing film according to claim 3, wherein the radically polymerizable compound (D) is acetoacetoxyalkyl (meth)acrylate.

6. The polarizing film according to claim 3, wherein the radical polymerization initiator (E) is a thioxanthone radical polymerization initiator.

7. The polarizing film according to claim 3, wherein the composition contains 1 to 50% by weight of the radically polymerizable compound (D) and 0.1 to 10% by weight of the radical polymerization initiator (E) based on 100% by weight of the total amount of the composition.

8. The polarizing film according to claim 1, wherein the active energy ray-curable adhesive composition further contains (F) a photo-acid generator.

9. The polarizing film according to claim 8, wherein the photo-acid generator (F) includes a photo-acid generator having at least one counter anion selected from the group consisting of $PF_6^-$, $SbF_6^-$, and $AsF_6^-$.

10. The polarizing film according to claim 8, wherein the active energy ray-curable adhesive composition contains the photo-acid generator (F) and (G) a compound having either an alkoxy group or an epoxy group.

11. The polarizing film according to claim 1, wherein the active energy ray-curable adhesive composition contains (H) an amino group-containing silane coupling agent.

12. The polarizing film according to claim 11, wherein the active energy ray-curable adhesive composition contains 0.01 to 20% by weight of the amino group-containing silane coupling agent (H) based on 100% by weight of the total amount of the composition.

13. The polarizing film according to claim 1, wherein the radically polymerizable compound (A) is hydroxyethylacrylamide and/or N-methylolacrylamide.

14. The polarizing film according to claim 1, wherein the radically polymerizable compound (B) is tripropylene glycol diacrylate.

15. The polarizing film according to claim 1, wherein the radically polymerizable compound (C) is acryloylmorpholine and/or N-methoxymethylacrylamide.

16. The polarizing film according to claim 1, wherein the active energy ray-curable adhesive composition contains, as a photopolymerization initiator, a compound represented by general formula (1):

[Formula 1]

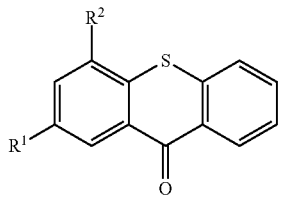

(1)

wherein $R^1$ and $R^2$ each represent —H, —$CH_2CH_3$, -i-Pr, or Cl, and $R^1$ and $R^2$ may be the same or different.

17. The polarizing film according to claim 16, wherein the active energy ray-curable adhesive composition further contains, as a photopolymerization initiator, a compound represented by general formula (2):

[Formula 2]

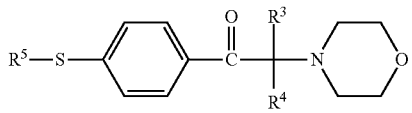

(2)

wherein $R^3$, $R^4$, and $R^5$ each represent —H, —$CH_3$, —$CH_2CH_3$, -i-Pr, or Cl, and $R^3$, $R^4$, and $R^5$ may be the same or different.

18. The polarizing film according to claim 1, wherein the transparent protective films have a 365 nm wavelength light transmittance of less than 5%.

19. The polarizing film according to claim 1, wherein the transparent protective films have an SP value of 29.0 $(MJ/m^3)^{1/2}$ to less than 33.0 $(MJ/m^3)^{1/2}$.

20. The polarizing film according to claim 1, wherein the transparent protective films have an SP value of 18.0 $(MJ/m^3)^{1/2}$ to less than 24.0 $(MJ/m^3)^{1/2}$.

21. The polarizing film according to claim 1, wherein the transparent protective films are made of one material selected from polycarbonate resin, cyclic olefin polymer resin, and (meth)acrylic resin.

22. The polarizing film according to claim 1, wherein the adhesive layers have a thickness of 0.01 μm to 7 μm.

23. A method of manufacturing a polarizing film comprising a polarizer and a transparent protective film that is provided on at least one surface of the polarizer with an adhesive layer interposed therebetween and has a water-vapor permeability of 150 g/m²/24 hours or less and a 365 nm wavelength light transmittance of less than 5%, the method comprising:
an application step comprising applying an active energy ray-curable adhesive composition to at least one surface of the polarizer or the transparent protective film, wherein the active energy ray-curable adhesive composition contains a radically polymerizable compound;
a lamination step comprising laminating the polarizer and the transparent protective film; and
a bonding step comprising curing the active energy ray-curable adhesive composition by applying an active energy ray to the composition from the polarizer side or the transparent protective film side to form an adhesive layer, so that the polarizer and the transparent protective film are bonded with the adhesive layer interposed therebetween,
so as to obtain the polarizing film according to claim 1.

24. The method according to claim 23, wherein before the application step, at least one surface of the polarizer or the transparent protective film, to which the active energy ray-curable adhesive composition is to be applied, is subjected to a corona treatment, a plasma treatment, a flame treatment, or an excimer treatment.

25. The method according to claim 23, wherein during the bonding step, the polarizer has a water content of less than 15%.

26. An optical film comprising a laminate including at least one piece of the polarizing film according to claim 1.

27. An image display device comprising the polarizing film according to claim 1.

28. An image display device comprising the optical film according to claim 26.

* * * * *